(12) United States Patent
Argoitia et al.

(10) Patent No.: US 9,164,575 B2
(45) Date of Patent: Oct. 20, 2015

(54) PROVISION OF FRAMES OR BORDERS AROUND PIGMENT FLAKES FOR COVERT SECURITY APPLICATIONS

(75) Inventors: Alberto Argoitia, Santa Rosa, CA (US); Cornelis Jan Delst, Fairfax, CA (US); Stacey A. Yamanaka, Windsor, CA (US); Wilfred C. Kittler, Jr., Rohnert Park, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1986 days.

(21) Appl. No.: 11/931,816

(22) Filed: Oct. 31, 2007

(65) Prior Publication Data
US 2008/0107856 A1    May 8, 2008

Related U.S. Application Data

(63) Continuation-in-part of application No. 11/243,122, filed on Oct. 4, 2005, now Pat. No. 7,645,510, which is a continuation-in-part of application No. 10/762,158, filed on Jan. 20, 2004, now Pat. No. 7,241,489, which
(Continued)

(51) Int. Cl.
*B32B 5/16* (2006.01)
*G06F 3/00* (2006.01)
(Continued)

(52) U.S. Cl.
CPC ............... *G06F 3/00* (2013.01); *C09C 1/0015* (2013.01); *C09C 1/0021* (2013.01); *C09C 1/642* (2013.01);
(Continued)

(58) Field of Classification Search
None
See application file for complete search history.

(56) References Cited

U.S. PATENT DOCUMENTS

| 2,570,856 A | 10/1951 | Pratt et al. ......................... 41/32 |
| 3,011,383 A | 12/1961 | Sylvester et al. ............ 359/584 |

(Continued)

FOREIGN PATENT DOCUMENTS

| AU | 488652 | 11/1977 | ................ B44F 1/12 |
| DE | 1696245 | 1/1972 | ................ D21H 5/10 |

(Continued)

OTHER PUBLICATIONS

R. Domnick et al, "Influence of Nanosized Metal Clusters on the Generation of Strong Colors and Controlling of their Properties through Physical Vapor Deposition (PVD)" 49th Annual Technical Conference Proceedings (2006), Society of vacuum Coasters.
(Continued)

*Primary Examiner* — Alicia Chevalier
*Assistant Examiner* — Chinessa Adkins
(74) *Attorney, Agent, or Firm* — Matthew A. Pequignot; Pequignot & Myers LLC

(57) ABSTRACT

Opaque flakes, such as pigment or bright flakes used in paints and inks, have a selected shape and/or other indicia to provide a covert security feature to an object. Shaped opaque covert flakes are not readily detectable by causal observation, but in some embodiments are easily seen at 50× magnification. In manufacturing the flakes a sheet of embossed frames are provided having embossed symbols or indicia within. Upon removing a coating from the embossed sheet the coating material tends to break along frame lines or grooves and the resulting flakes are substantially uniform in size. In order to have the flakes break along frame lines or grooves more readily than along the embossing or grooves defining indicia within a frame, the frames are provided with a deeper groove than indicia grooves. As well a groove having a different shaped profile conducive to breakage can be used for the frame grooves whereas a groove having a profile less conducive to breakage can be used to form the indicia grooves. We have found that the flakes can be further protected from breakage by coating them in a protective coating. This coating may have other features which makes the logo more visible.

25 Claims, 12 Drawing Sheets

FIG. 1

Related U.S. Application Data is a continuation-in-part of application No. 10/641,695, filed on Aug. 14, 2003, now Pat. No. 7,258,915, which is a continuation-in-part of application No. 10/243,111, filed on Sep. 13, 2002, now Pat. No. 6,902,807.

(60) Provisional application No. 60/696,593, filed on Jul. 5, 2005.

(51) Int. Cl.
  *C09C 1/00* (2006.01)
  *C09C 1/64* (2006.01)

(52) U.S. Cl.
  CPC ..... *B42D 2035/34* (2013.01); *C09C 2200/1054* (2013.01); *C09C 2210/30* (2013.01); *C09C 2210/40* (2013.01); *C09C 2220/20* (2013.01); *Y10T 428/15* (2015.01); *Y10T 428/2982* (2015.01); *Y10T 428/2991* (2015.01); *Y10T 428/2998* (2015.01)

(56) References Cited

U.S. PATENT DOCUMENTS

| | | | |
|---|---|---|---|
| 3,123,490 A | 3/1964 | Bolomey et al. | 106/291 |
| 3,338,730 A | 8/1967 | Slade et al. | 428/142 |
| 3,610,721 A | 10/1971 | Abramson et al. | 350/3.5 |
| 3,627,580 A | 12/1971 | Krall | 117/238 |
| 3,633,720 A | 1/1972 | Tyler | 400/105 |
| 3,676,273 A | 7/1972 | Graves | 161/3 |
| 3,790,407 A | 2/1974 | Merten et al. | 117/240 |
| 3,791,864 A | 2/1974 | Steingroever | 117/238 |
| 3,845,499 A | 10/1974 | Ballinger | 346/74.3 |
| 3,853,676 A | 12/1974 | Graves | 161/5 |
| 3,873,975 A | 3/1975 | Miklos et al. | 360/25 |
| 4,011,009 A | 3/1977 | Lama et al. | 359/571 |
| 4,053,433 A | 10/1977 | Lee | 252/408 |
| 4,054,922 A | 10/1977 | Fichter | 346/74.3 |
| 4,066,280 A | 1/1978 | LaCapria | 283/91 |
| 4,099,838 A | 7/1978 | Cook et al. | 359/537 |
| 4,126,373 A | 11/1978 | Moraw | 359/2 |
| 4,155,627 A | 5/1979 | Gale et al. | 359/568 |
| 4,168,983 A | 9/1979 | Vittands et al. | 106/14.12 |
| 4,197,563 A | 4/1980 | Michaud | 346/74.3 |
| 4,244,998 A | 1/1981 | Smith | 428/195 |
| 4,271,782 A | 6/1981 | Bate et al. | 118/623 |
| 4,310,584 A | 1/1982 | Cooper et al. | 428/212 |
| 4,398,798 A | 8/1983 | Krawczak et al. | 359/573 |
| 4,434,010 A | 2/1984 | Ash | 106/415 |
| 4,543,551 A | 9/1985 | Peterson | 335/284 |
| 4,705,300 A | 11/1987 | Berning et al. | 283/91 |
| 4,705,356 A | 11/1987 | Berning et al. | 350/166 |
| 4,721,217 A | 1/1988 | Phillips et al. | 215/230 |
| 4,756,771 A | 7/1988 | Brodalla et al. | 148/244 |
| 4,779,898 A | 10/1988 | Berning et al. | 283/58 |
| 4,788,116 A | 11/1988 | Hochberg | 430/21 |
| 4,838,648 A | 6/1989 | Phillips et al. | 359/585 |
| 4,867,793 A | 9/1989 | Franz et al. | 106/415 |
| 4,930,866 A | 6/1990 | Berning et al. | 359/589 |
| 4,931,309 A | 6/1990 | Komatsu et al. | 427/599 |
| 5,002,312 A | 3/1991 | Phillips et al. | 283/72 |
| 5,009,486 A | 4/1991 | Dobrowolski et al. | 359/580 |
| 5,059,245 A | 10/1991 | Phillips et al. | 106/31.65 |
| 5,079,058 A | 1/1992 | Tomiyama | 428/40 |
| 5,079,085 A | 1/1992 | Hashimoto et al. | 428/327 |
| 5,084,351 A | 1/1992 | Philips et al. | 428/411.1 |
| 5,106,125 A | 4/1992 | Antes | 283/91 |
| 5,128,779 A | 7/1992 | Mallik | 359/2 |
| 5,135,812 A | 8/1992 | Phillips et al. | 428/403 |
| 5,142,383 A | 8/1992 | Mallik | 359/2 |
| 5,171,363 A | 12/1992 | Phillips et al. | 106/31.65 |
| 5,177,344 A | 1/1993 | Pease | 235/449 |
| 5,186,787 A | 2/1993 | Phillips et al. | 216/36 |
| 5,192,611 A | 3/1993 | Tomiyama et al. | 428/354 |
| 5,214,530 A | 5/1993 | Coombs et al. | 359/359 |
| 5,223,360 A | 6/1993 | Prengel et al. | 430/39 |
| 5,254,390 A | 10/1993 | Lu | 428/156 |
| 5,278,590 A | 1/1994 | Phillips et al. | 359/589 |
| 5,279,657 A | 1/1994 | Phillips et al. | 106/31.65 |
| 5,339,737 A | 8/1994 | Lewis et al. | 101/454 |
| 5,354,374 A | 10/1994 | Prengel | 106/459 |
| 5,364,467 A | 11/1994 | Schmid et al. | 106/404 |
| 5,364,689 A | 11/1994 | Kashiwagi et al. | 428/195.1 |
| 5,368,898 A | 11/1994 | Akedo | 427/510 |
| 5,411,296 A | 5/1995 | Mallik | 283/86 |
| 5,424,119 A | 6/1995 | Phillips et al. | 428/328 |
| 5,437,931 A | 8/1995 | Tsai et al. | 428/446 |
| 5,447,335 A | 9/1995 | Haslop | 283/91 |
| 5,464,710 A | 11/1995 | Yang | 430/1 |
| 5,474,814 A | 12/1995 | Komatsu et al. | 427/549 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,591,527 A | 1/1997 | Lu | 428/411.1 |
| 5,613,022 A | 3/1997 | Odhner et al. | 385/37 |
| 5,624,076 A | 4/1997 | Miekka et al. | 241/3 |
| RE35,512 E | 5/1997 | Nowak et al. | 101/454 |
| 5,627,663 A | 5/1997 | Horan et al. | 359/2 |
| 5,629,068 A | 5/1997 | Miekka et al. | 428/148 |
| 5,630,877 A | 5/1997 | Kashiwagi et al. | 118/623 |
| 5,648,165 A | 7/1997 | Phillips et al. | 428/346 |
| 5,650,248 A | 7/1997 | Miekka et al. | 430/1 |
| 5,672,410 A | 9/1997 | Miekka et al. | 428/148 |
| 5,700,550 A | 12/1997 | Uyama et al. | 428/212 |
| 5,742,411 A | 4/1998 | Walters | 359/2 |
| 5,744,223 A | 4/1998 | Abersfelder et al. | 428/206 |
| 5,763,086 A | 6/1998 | Schmid et al. | 428/404 |
| 5,811,775 A | 9/1998 | Lee | 235/457 |
| 5,814,367 A | 9/1998 | Hubbard et al. | 427/162 |
| 5,815,292 A | 9/1998 | Walters | 359/2 |
| 5,856,048 A | 1/1999 | Tahara et al. | 430/1 |
| 5,858,078 A | 1/1999 | Andes et al. | 106/437 |
| 5,907,436 A | 5/1999 | Perry et al. | 359/576 |
| 5,912,767 A | 6/1999 | Lee | 359/567 |
| 5,989,626 A | 11/1999 | Coombs et al. | 427/162 |
| 5,991,078 A | 11/1999 | Yoshitake et al. | 359/567 |
| 6,013,370 A | 1/2000 | Coulter et al. | 428/403 |
| 6,031,457 A | 2/2000 | Bonkowski et al. | 340/572.1 |
| 6,033,782 A | 3/2000 | Hubbard et al. | 428/407 |
| 6,043,936 A | 3/2000 | Large | 359/572 |
| 6,045,230 A | 4/2000 | Dreyer et al. | 359/529 |
| 6,068,691 A | 5/2000 | Miekka et al. | 106/403 |
| 6,103,361 A | 8/2000 | Batzar et al. | 428/323 |
| 6,112,388 A | 9/2000 | Kimoto et al. | 29/17.3 |
| 6,114,018 A | 9/2000 | Phillips et al. | 428/200 |
| 6,150,022 A | 11/2000 | Coulter et al. | 428/403 |
| 6,157,489 A | 12/2000 | Bradley, Jr. et al. | 359/584 |
| 6,168,100 B1 | 1/2001 | Kato et al. | 241/1 |
| 6,235,105 B1 | 5/2001 | Hubbard et al. | 106/415 |
| 6,241,858 B1 | 6/2001 | Phillips et al. | 204/192.15 |
| 6,242,510 B1 | 6/2001 | Killey | 523/204 |
| 6,243,204 B1 | 6/2001 | Bradley, Jr. et al. | 359/585 |
| 6,403,169 B1 | 6/2002 | Hardwick et al. | 427/548 |
| 6,549,131 B1 | 4/2003 | Cote et al. | 340/572.1 |
| 6,572,784 B1 * | 6/2003 | Coombs et al. | 252/301.16 |
| 6,586,098 B1 | 7/2003 | Coulter et al. | 428/403 |
| 6,589,331 B2 | 7/2003 | Ostertag et al. | 106/460 |
| 6,630,018 B2 | 10/2003 | Bauer et al. | 106/415 |
| 6,643,001 B1 * | 11/2003 | Faris | 356/37 |
| 6,649,256 B1 | 11/2003 | Buczek et al. | 428/323 |
| 6,686,027 B1 | 2/2004 | Caporaletti et al. | 428/195.1 |
| 6,692,830 B2 | 2/2004 | Argoitia et al. | 428/403 |
| 6,712,399 B1 | 3/2004 | Drinkwater et al. | 283/111 |
| 6,749,777 B2 | 6/2004 | Argoitia et al. | 252/582 |
| 6,749,936 B2 | 6/2004 | Argoitia et al. | 428/402 |
| 6,751,022 B2 | 6/2004 | Phillips | 359/577 |
| 6,759,097 B2 | 7/2004 | Phillips et al. | 427/510 |
| 6,761,959 B1 | 7/2004 | Bonkowski et al. | 428/156 |
| 6,815,065 B2 | 11/2004 | Argoitia et al. | 428/403 |
| 6,818,299 B2 | 11/2004 | Phillips et al. | 428/403 |
| 6,838,166 B2 | 1/2005 | Phillips et al. | 428/323 |
| 6,902,807 B1 | 6/2005 | Argoitia et al. | 428/403 |
| 6,987,590 B2 | 1/2006 | Phillips et al. | 359/2 |

(56) References Cited

U.S. PATENT DOCUMENTS

| | | | |
|---|---|---|---|
| 7,029,525 B1 | 4/2006 | Mehta | 106/31.6 |
| 7,396,401 B2 | 7/2008 | Jungnitz et al. | 106/415 |
| 2002/0021003 A1 | 2/2002 | McGrew | 283/93 |
| 2002/0182383 A1 | 12/2002 | Phillips | 428/199 |
| 2003/0058491 A1 | 3/2003 | Holmes et al. | 359/2 |
| 2003/0087070 A1 | 5/2003 | Souparis | 283/91 |
| 2003/0185972 A1 | 10/2003 | Rieck et al. | 427/140 |
| 2003/0190473 A1 | 10/2003 | Argoitia et al. | 428/323 |
| 2004/0009309 A1 | 1/2004 | Raksha et al. | 427/598 |
| 2004/0051297 A1 | 3/2004 | Raksha et al. | 101/489 |
| 2004/0067360 A1* | 4/2004 | Steenblik et al. | 428/402 |
| 2004/0081807 A1 | 4/2004 | Bonkowski et al. | 428/195.1 |
| 2004/0094850 A1 | 5/2004 | Bonkowski et al. | 264/1.34 |
| 2004/0100707 A1 | 5/2004 | Kay et al. | 359/883 |
| 2004/0101676 A1 | 5/2004 | Phillips | 428/323 |
| 2004/0105963 A1 | 6/2004 | Bonkowski et al. | 428/195.1 |
| 2004/0151827 A1 | 8/2004 | Argoitia et al. | 427/7 |
| 2005/0024626 A1 | 2/2005 | Faris et al. | 356/71 |
| 2005/0037192 A1 | 2/2005 | Argoitia et al. | 428/323 |
| 2005/0063067 A1 | 3/2005 | Phillips et al. | 359/623 |
| 2005/0106367 A1 | 5/2005 | Raksha et al. | 428/195.1 |
| 2005/0123755 A1 | 6/2005 | Argoitia et al. | 428/402 |
| 2005/0128543 A1 | 6/2005 | Phillips et al. | 359/15 |
| 2005/0189060 A1 | 9/2005 | Huang et al. | 156/99 |
| 2006/0035080 A1 | 2/2006 | Argoitia et al. | 428/402 |
| 2006/0077496 A1 | 4/2006 | Argoitia | 359/2 |
| 2007/0058227 A1 | 3/2007 | Raksha et al. | 359/2 |
| 2008/0069979 A1 | 3/2008 | Raksha et al. | 428/29 |

FOREIGN PATENT DOCUMENTS

| | | | |
|---|---|---|---|
| DE | 3932505 | 4/1991 | B44F 1/12 |
| DE | 4212290 | 5/1993 | B44F 1/12 |
| DE | 4343387 | 6/1995 | B44F 1/12 |
| DE | 19611383 | 9/1997 | B44F 1/12 |
| DE | 19731968 | 1/1999 | B44F 1/12 |
| DE | 19744953 | 4/1999 | B44F 1/12 |
| DE | 19639165 | 10/2003 | C09B 67/02 |
| EP | 0138194 | 10/1984 | B32B 27/08 |
| EP | 0185396 | 12/1985 | D21H 5/10 |
| EP | 0341002 | 11/1989 | G06K 19/08 |
| EP | 0420261 | 4/1991 | G06K 19/00 |
| EP | 0453131 | 10/1991 | B32B 29/04 |
| EP | 0556449 | 8/1993 | B05D 3/14 |
| EP | 406667 | 1/1995 | B05D 31/00 |
| EP | 0660262 | 1/1995 | G06K 19/16 |
| EP | 0170439 | 4/1995 | G02B 5/20 |
| EP | 710508 | 5/1996 | B05D 3/14 |
| EP | 0756945 | 2/1997 | B42D 15/00 |
| EP | 0395410 | 8/1997 | G02B 5/28 |
| EP | 0698256 | 10/1997 | G06K 19/14 |
| EP | 0741370 | 5/1998 | G06K 19/18 |
| EP | 0914261 | 5/1999 | B42D 15/10 |
| EP | 0953937 | 11/1999 | G06K 19/08 |
| EP | 1174278 | 1/2002 | B41M 3/14 |
| EP | 0978373 | 2/2002 | B32B 7/02 |
| EP | 1239307 | 9/2002 | G02B 5/22 |
| EP | 1 353 197 | 10/2003 | G02B 5/18 |
| EP | 1 498 545 A | 1/2005 | D21H 21/42 |
| EP | 1516957 | 3/2005 | D21H 21/42 |
| EP | 1529653 | 5/2005 | B42D 15/00 |
| EP | 1674282 | 6/2006 | B41M 3/14 |
| EP | 1719636 | 11/2006 | B42D 15/10 |
| EP | 1 741 757 | 1/2007 | C09C 1/00 |
| EP | 1745940 | 1/2007 | B41M 5/36 |
| EP | 1760118 | 3/2007 | C09C 1/00 |
| GB | 1107395 | 3/1968 | G03G 1/00 |
| GB | 1131038 | 10/1968 | B44F 3/00 |
| JP | 63172279 | 7/1988 | G03G 9/08 |
| JP | 11010771 | 1/1999 | B32B 7/02 |
| WO | 8807214 | 9/1988 | G02B 5/128 |
| WO | 9323251 | 11/1993 | B41M 3/14 |
| WO | 9517475 | 1/1995 | C09C 1/00 |
| WO | 9513569 | 5/1995 | G03F 7/00 |
| WO | 9719820 | 6/1997 | B42D 15/10 |
| WO | 9812583 | 3/1998 | G02B 5/28 |
| WO | 0008596 | 2/2000 | G06K 19/06 |
| WO | 0103945 | 1/2001 | B42D 15/10 |
| WO | WO 01/53113 A | 7/2001 | B42D 15/10 |
| WO | 0200446 | 1/2002 | B42D 15/10 |
| WO | 0204234 | 1/2002 | B44F 1/10 |
| WO | 0240599 | 5/2002 | C09C 1/00 |
| WO | 0240600 | 5/2002 | C09C 1/00 |
| WO | 02053677 | 7/2002 | C09K 11/08 |
| WO | 02090002 | 11/2002 | B05D 3/14 |
| WO | 03102084 | 12/2003 | C09C 1/00 |
| WO | 2004/024836 | 3/2004 | C09D 5/36 |
| WO | 2005/017048 | 2/2005 | C09C 1/00 |

OTHER PUBLICATIONS

Llewellyn, "Dovids: Functional Beauty—discussion about holography", Paper, Film, and Foil Converter, Aug. 2002.

Hardin, "Optical tricks designed to foil counterfeiters", OE Reports, No. 191, Nov. 1999.

Argoitia and Witzman, Pigments Exhibiting Diffractive Effects, Soc. of Vac. Coaters, 45th Annual Tech. Conf. Proceed. (2002).

Powell et al. (ED), "Vapor Disposition", John Wiley & Sons, p. 132, 1996.

Van Renesse (Ed.), "Optical Document Security", 2nd Ed., Artech House 254, 349-69 (1997).

Lotz et al., *Optical Layers on Large Area Plastic Films*, Precision, Applied Films (Nov. 2001).

Himpsel et al., *Nanowires by Step Decoration*, Mat. Research Soc. Bul., pp. 20-24 (Aug. 1999).

Prokes and Wang (ED.), *Novel Methods of Nanoscale Wire Formation*, Mat. Research Soc. Bul., pp. 13-14 (Aug. 1999).

Dobrowolski et al., "Research on Thin Film Anticounterfeiting Coatings at the National Research Council of Canada", Applied Optics, vol. 28, No. 14, pp. 2702-2717, Jul. 15, 1989.

Halliday et al, "Fundamentals of Physics, Sixth Edition", p. 662, Jul. 2000.

Argoitia et al, "Pigments Exhibiting Diffractive Effects", Soc. of Vac. Coaters, 45th Annual Tech. Conf. Proceed. (2002).

Argoitia et al, "The concept of printable holograms through the alignment of diffractive pigments", SPIE Conference on Document Security, Jan. 2004.

Coombs et al, "Integration of contracting technologies into advanced optical security devices", SPIE Conference on Document Security, Jan. 2004.

"Optical Thin-Film Security Devices", J.A. Dobrowolski, Optical Security Document, Rudolf Van Renesse, Artech House, 1998, pp. 289-328.

"Paper Based Document Security—a Review" Rudolf L. van Renesse, European Conference on Security and Detection, Apr. 28-30, 1997, Conference Publication No. 437, p. 75-80.

Diffractive Microstructures for Security Applications: M. T. Gale, Paul Scherrer Institute, Zurich, IEEE Conference Publication London 1991, pp. 205-209, Sep. 16-18, 1991.

Definition of "directly" from Webster's Third New International Dictionary, 1993, p. 641.

John M. McKiernan et al; "Luminescence and Laser Action of Coumarin Dyes Doped in Silicate and Aluminosilicate Glasses Prepared by Sol-Gel Technique," Journal of Inorganic and Organometallic Polymers, vol. 1, No. 1, 1991, pp. 87-103.

Jeffrey I. Zink et al, "Optical Probes and Properties of Aluminosilicate Glasses Prepared by the Sol-Gel Method," Polym. Mater. Sci. Eng., pp. 204-208 (1989).

"Security Enhancement of Holograms with Interference Coatings" by Phillips et al. Optical Security and Counterfeit Deterrence Techniques III Proceedings of SPIE vol. 3973 p. 304-316 (2000).

Don W. Tomkins, Kurz Hastings, "Transparent Overlays for Security Printing and Plastic ID Cards" pp. 1-8, Nov. 1997.

The Mearl Corporation Brochure for "Mearl Iridescent Film" Peekskill, NY.

J.A. Dobrowolski et al, "Optical Interference Coatings for Inhibiting of Counterfeiting" Optica Acta, 1973, vol. 20, No. 12, 925-037.

(56) References Cited

OTHER PUBLICATIONS

The R.D. Mathis Company Manual for "Thin Film Evaporation Source Reference" Long Beach, CA.
Minolta Manual for "Precise Color Communication, Color Control From Feeling to Instrumentation" pp. 18, 20, 22-23, 46-49.
Frans Defilet, LGZ Landis & Gyr Zug Corporation, "Kinegrams 'Optical Variable Devices' (OVD's) for Banknotes, Security Documents and Plastic Cards" San Diego, Apr. 1-3, 1987.
S.P. McGrew, "Hologram Counterfeiting: Problems and Solutions" SPIE, vol. 1210 Optical Security and Anticounterfeiting Systems, 1990, pp. 66-76.
Rudolf L. van Renesse, "Security Design of Valuable Documents and Products" SPIE, vol. 2659, Jun. 1996, pp. 10-20.
Steve McGrew, "Countermeasures Against Hologram Counterfeiting" Internet site www.iea.com/nli/publication/countermeasures.htm, Jan. 6, 2000.
Roger W. Phillips, "Optically Variable Films, Pigments, and Inks" SPIE vol. 1323 Optical Thin Films III: New Developments, 1990, pp. 98-109.
Roger W. Phillips et al. "Optical Coatings for Document Security" Applied Optics, vol. 35, No. 28, Oct. 1, 1996 pp. 5529-5534.
J. Rolfe "Optically Variable Devices for use on Bank Notes" SPIE, vol. 1210 Optical Security and Anticounterfeiting Systems, pp. 14-19, 1990.
OVD Kinegram Cor "OVD Kinegram Management of Light to Provide Security" Internet site www.kiknegram.com.xhome.html, Dec. 17, 1999.
I.M. Boswarva et al., "Roll Coater System for the Production of Optically Variable Devices (OVD's) for Security Applications" Proceedings, $33^{rd}$ Annual technical Conference, Society of Vacuum Coaters, pp. 103-109 (1990).

\* cited by examiner

Case 2. Deeper frames than symbols

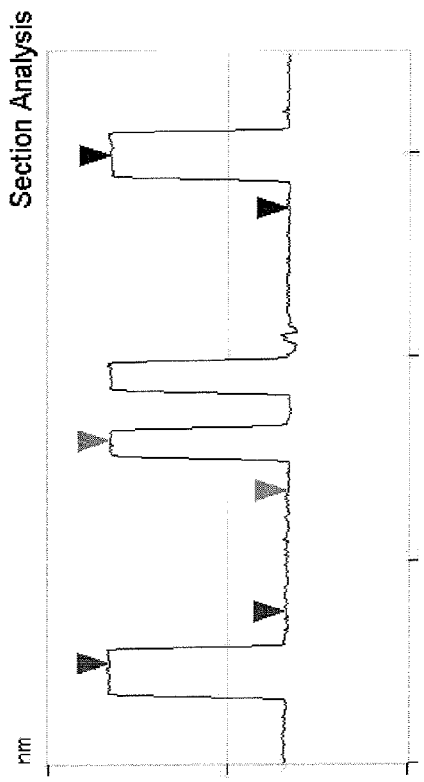
Fig. 11d
Case 1. Single level for frames and symbols
Fig. 11e
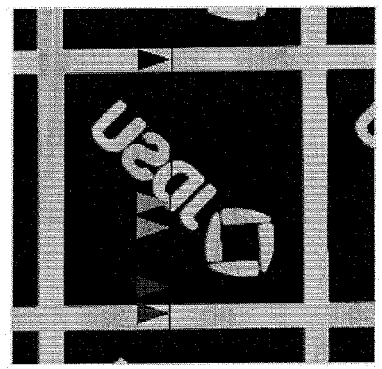
Fig. 11f

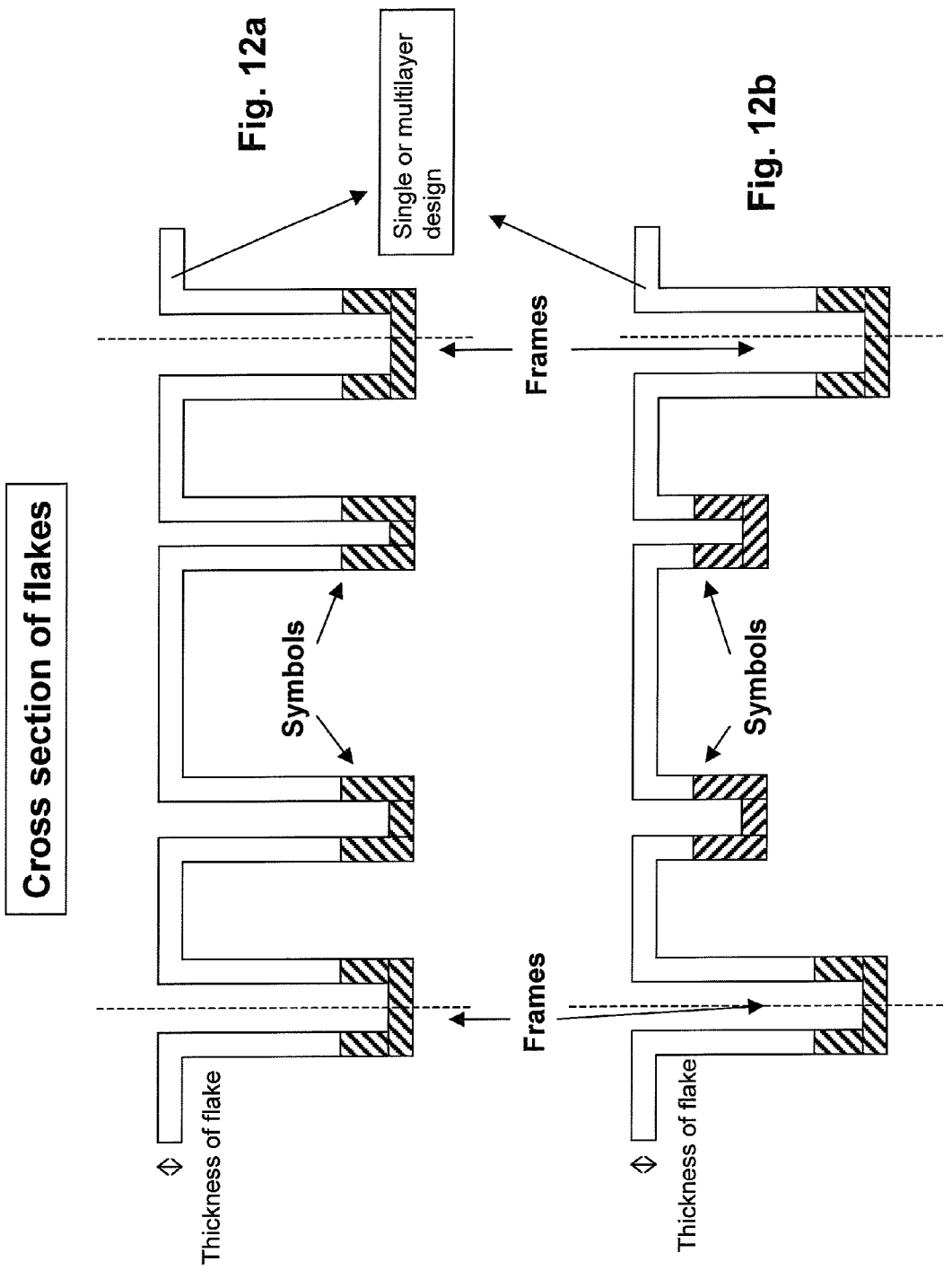

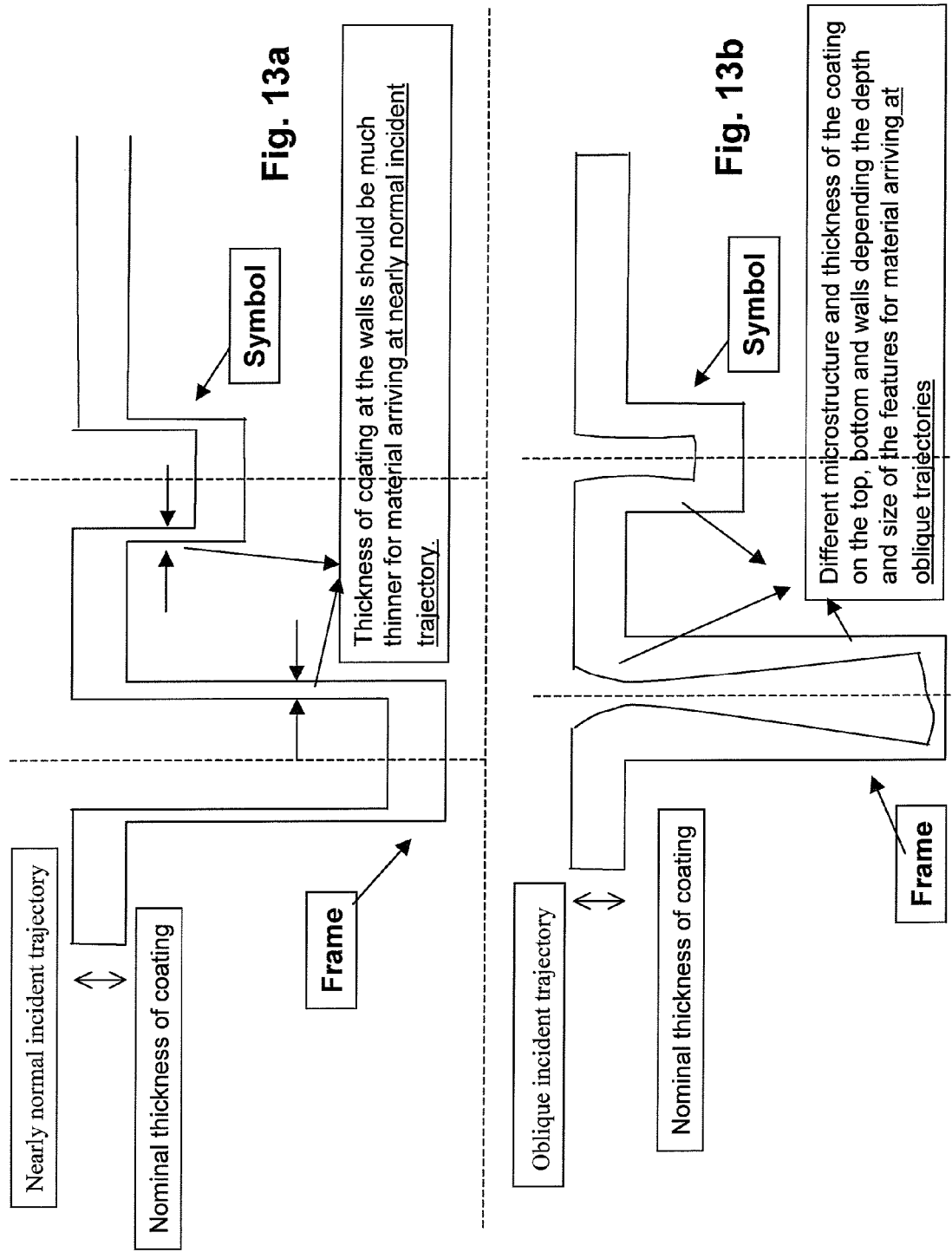

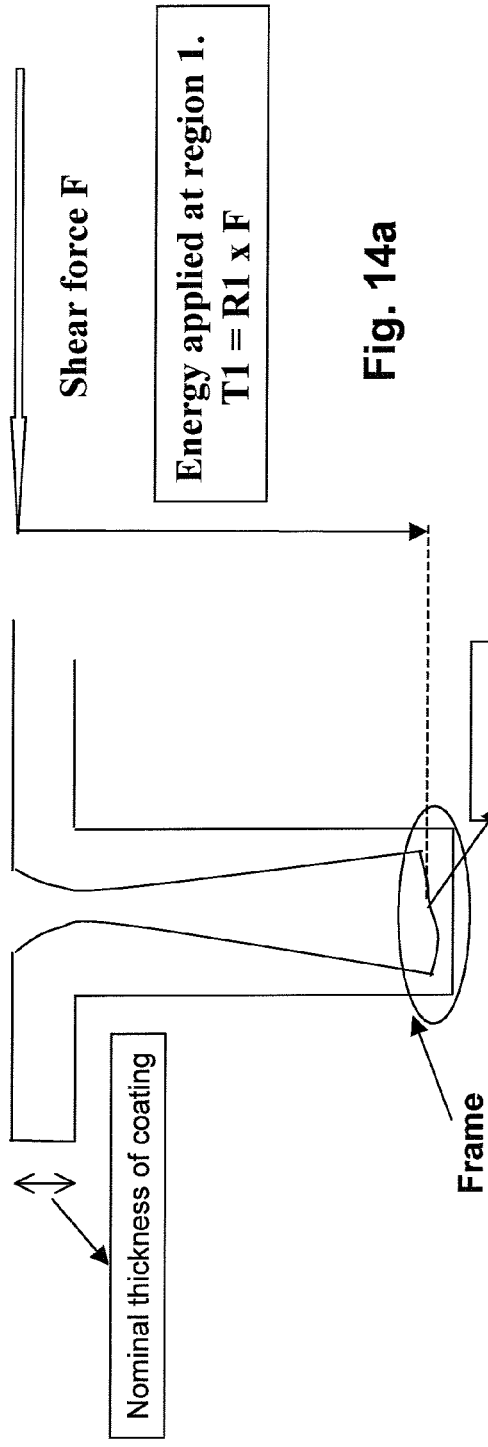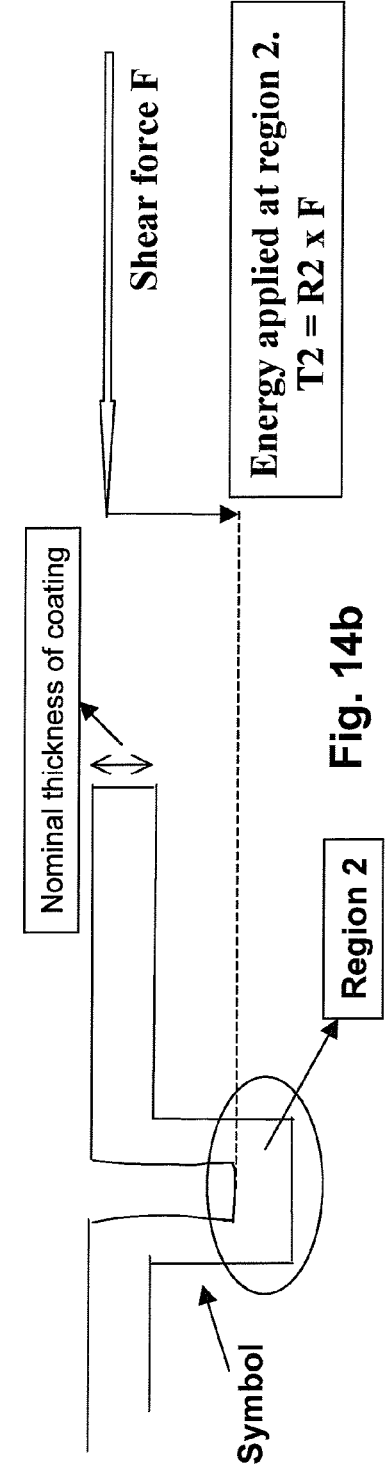
Fig. 14a
Fig. 14b
T1 > T2. Breakage of a flake at region 1 should be faster and easier that at region 2. This applied even if the thickness at the bottom of the frames and symbols are similar

PROVISION OF FRAMES OR BORDERS AROUND PIGMENT FLAKES FOR COVERT SECURITY APPLICATIONS

CROSS-REFERENCE TO RELATED APPLICATIONS

This application is a continuation-in-part of commonly owned, U.S. Pat. No. 7,645,510 entitled PROVISION OF FRAMES OR BORDERS AROUND OPAQUE FLAKES FOR COVERT SECURITY APPLICATIONS by Alberto Argoitia issued Jan. 12, 2010, which is a continuation-in-part of commonly owned, U.S. patent application Ser. No. 10/762,158 entitled OPAQUE FLAKE FOR COVERT SECURITY APPLICATIONS by Alberto Argoitia, Paul G. Coombs and Charles T. Markantes filed Jan. 20, 2004, now issued U.S. Pat. No. 7,241,489, which is a continuation-in-part of commonly owned, U.S. patent application Ser. No. 10/641,695 entitled FLAKE FOR COVERT SECURITY APPLICATIONS by Alberto Argoitia, Paul G. Coombs, and Charles T. Markantes, filed Aug. 14, 2003, now issued U.S. Pat. No. 7,258,915, and which is also a continuation-in-part of commonly owned, U.S. patent application Ser. No. 10/243,111, now issued U.S. Pat. No. 6,902,807, entitled ALIGNABLE DIFFRACTIVE PIGMENT FLAKES by Alberto Argoitia, Vladimir P Raksha, and Dishuan Chu, filed Sep. 13, 2002, the disclosures of which are hereby incorporated in their entirety for all purposes.

U.S. Pat. No. 7,645,510 also claims priority from U.S. Patent Application No. 60/696,593 filed Jul. 5, 2005, which is incorporated herein by reference for all purposes.

FIELD OF THE INVENTION

The present invention relates generally to thin pigment flakes, and more particularly to providing a border or frame around taggent flakes for use in a coating composition and the provision of indicia defined by one or more grooves within a framed region of a flake; and, more particularly the invention provides a frame and indicia with a frame wherein the grooved frame is less robust and more easily fracturable than the grooved indicia.

BACKGROUND OF THE INVENTION

Specialty pigments have been developed for use in security applications, such as anti-counterfeiting devices printed on banknotes, packaging of high-value items, seals for containers, and even for direct application to commercial items. For example, the U.S. twenty-dollar Federal Reserve Note currently uses optically variable ink. The number "20" printed in the lower-right corner of the face of the note changes color as the viewing angle changes. This is an overt anti-counterfeiting device. The color-shifting effect is not reproducible by ordinary color photocopiers, and someone receiving a note can observe whether it has the color-shifting security feature to determine the note's authenticity.

Other high-value documents and objects use similar measures. For example, iridescent pigments or diffractive pigments are used in paints and inks that are applied directly to an article, such as a stock certificate, passport, original product packaging, or to seals that are applied to an article. Security features that are more difficult to counterfeit are desirable as counterfeiters continue to become more sophisticated.

One anti-counterfeiting approach uses microscopic symbols on multi-layer color-shifting pigment flakes. The symbols are formed on at least one of the layers of the multi-layer color-shifting pigment flakes by a local change of an optical property(s), such as reflectivity. The multi-layer color-shifting pigment flakes generally include a Fabry Perot-type structure having an absorbing layer separated from a reflective layer by a spacer layer. The reflective layer is typically a layer of metal, which renders the pigment flake essentially opaque. If a large portion of these types of pigment flakes are mixed with other pigment, the resultant color might be significantly different from the pigment, and if too few of these flakes are mixed with other pigment, they might be difficult to find.

Another technique uses epoxy-encapsulated shaped flakes of polyethylene terephthalate ("PET"). A reflective layer is deposited on a roll of PET, and then the PET is cut into pieces. The flakes are coated or encapsulated with epoxy to improve the durability of the reflective layer. These flakes are available in a variety of shapes, such as square, rectangle, hexagon, and "apostrophe," and a selection of reflective metallic tints, such as silver, pewter, gold, and copper. However, the epoxy layer and the relatively thick PET substrate (which typically has a minimum thickness of about 13 microns (0.5 mils) for use in vacuum deposition processes) result in a relatively thick flake, typically greater than 14 microns. Unfortunately, such a thick flake is not desirable for use in covert applications where the thickness is substantially greater than the base pigment. Similarly, such thick flakes do not flow well in inks, and create lumps in paint. When paint includes a thick flake that creates a rough surface, a relatively thick clear topcoat is typically applied over the rough surface.

It is desirable to mark objects with covert anti-counterfeiting devices that overcome the limitations of the techniques discussed above.

This invention relates to providing flakes which have taggents or covert symbols stamped or embossed or etched therein by mechanical means or formed by laser means, wherein the covert symbols can be seen with a microscope. In order to preserve the integrity of the symbols, a frame is provided around all of or part of covert symbols so that when the individual flakes are removed from the support structure they are deposited on, the majority of flakes break along the frame lines provided instead of breaking in a less controlled unpredictable manner wherein break lines would otherwise occur with greater frequency through and about the symbols. To further attempt to ensure that breakage occurs along frame lines or grooves, the frames grooves may have a different profile than the grooves defining the covert symbols, wherein the frame grooves are designed to break or crack more readily than the covert symbol grooves. In some instances parallel frame lines may be provided so that the flakes break into a ribbon; in a preferred embodiment of this invention, flakes and more particularly one or more symbols within a flake will have a framed grooved border on more than four or fewer sides about the one or more symbols, so that the flakes break in uniform squares or rectangles along the frame lines. Of course triangular or hexagonal flakes may be provided as well in this manner, by pre-framing symbols on three sides, prior to removing the flakes from their backing. A conventional release layer is provided so that the flakes can easily be removed from their backing or support layer and so that upon removal, the flakes break up along the framing lines. Frames can be made in a similar manner in which the symbols are made; using a laser, etching or stamping of the film that is upon the substrate; in a preferred embodiment, the frames are provided in the same process along with the formation of the symbols.

The term "embossed flakes" used hereafter describes flakes which are embossed by application of pressure to a flake with an embossing tool, or to flakes which are formed on an embossed substrate by being coated upon the embossed substrate, taking the form of the substrate.

It is therefore an object of this invention, to provide flakes having symbols thereon, and wherein the symbols have or had, frames or borders embossed, etched or lasered into the flake or the flake molded from an embossed temporary support, for protecting the symbols during the process of separating flakes from their temporary support backing and wherein the frame grooves are deeper and/or more fracturable than the grooves defining indicia or symbols within a frame.

It is an object of this invention to provide frame grooves that have a different cross sectional profile than the indicia grooves and wherein the frame grooves are designed to break or crack more readily than the indicia grooves.

In another aspect of the invention, the substrate is pre-metalized before adding a release layer to it. After flakes are separated from the release layer the embossed substrate can be cut up into reflective flakes rather than being reused to provide another batch of coated flakes. The pre-metalized substrate can be severed into lengthwise strips to make a new security device (i.e a thread) that contains the same matching design as the flakes produced with the substrate.

In another aspect of the invention, the "sized" flakes after removal from the substrate and properly post process to produce the shaped/symboled flakes are encapsulated to improve the durability of the flakes against breakage during printing or painting applications.

SUMMARY OF THE INVENTION

In accordance with this invention, there is provided a plurality of pigment taggent flakes, each flake comprising a frame about a periphery thereof defined by walls, and a region within the frame, wherein the height of at least one of the frame walls is at least height $F_h$, and wherein the region within the frame has indicia defined by one or more grooves formed therein having a depth of less than $I_d$, wherein $F_h > I_d$.

In accordance with another aspect of the invention, there is provide a sheet of taggent regions, for forming taggent flakes comprising:

a substrate embossed with a plurality frame grooves having a depth $F_h$ defining frames, and a plurality of indicia grooves forming indicia within each frame, wherein the depth of the indicia grooves are less than $I_d$, and wherein $F_h > I_d$, so that breakage is more likely to occur along frame grooves than along the indicia grooves, when the sheet or coating upon the sheet is separated into taggent flakes.

In accordance with another aspect of the invention, there is provided, a coating composition comprising a carrier; and a plurality of single-layer inorganic dielectric covert taggent flakes dispersed in the carrier, wherein the flakes are surrounded by a frame and wherein a discernible symbol is formed in region inside of the frame, and wherein a frame wall is deeper than a wall of a groove defining the discernible symbol.

In accordance with another aspect of the invention, a method is provided for producing flakes having indicia thereon, the method comprising the steps of: providing a substrate coated with a release layer; providing an optical coating of one or more layers upon the release layer; inscribing indicia in the form of one or more symbols in a plurality of regions upon the optical coating, wherein the inscribed indicia is in the form of one or more grooves formed within the optical coating; inscribing a grooved frame about the indicia, in each region, wherein the grooved frame is deeper than the one or more grooves forming the indicia; removing the optical coating from the release layer such that the coating is broken alone the grooved frame into flakes in the form framed indicia.

In yet another aspect of the invention, flakes are provided which have at least one symbol thereon, wherein the flakes have been separated from adjacent flakes by separating along grooved frames or borders etched, lasered or embossed into a support sheet prior to their removal from the support sheet and wherein the frames or borders defining the periphery of a flake are more breakable than the at least one symbol thereon.

In accordance with another aspect this invention provides a plurality of embossed pigment covert taggent flakes, coated with a light transmissive non-conforming coating reducing depth of grooves within the flake.

In accordance with another aspect of the invention there is provided a foil comprising a substrate having one or more thin film layers releasably deposited thereon for forming flakes once removed from the substrate, the one or more thin film layers having a plurality of framed symbols formed therein forming grooves or ridges, wherein the frames about the symbols provide lines for the flakes to separate along upon removal of the one or more thin film layers from the substrate, and wherein the frames have deeper grooves than the symbols.

BRIEF DESCRIPTION OF THE DRAWINGS

Exemplary embodiments will now be described in conjunction with the drawings, in which:

FIG. 11b is a section analysis of the substrate shown in FIG. 11a.

FIG. 11c is a normal view of the substrate of FIG. 11a

FIG. 11d is an isometric view of a cut-away embossed substrate illustrating the height of frame walls and logo walls projecting from the substrate.

FIG. 11e is a section analysis of the substrate shown in FIG. 11d.

FIG. 11f is a normal view of the substrate of FIG. 11d.

FIG. 12a is an illustration of a cross section of a prior art flake of uniform coating FIG. 12b is an illustration of a cross section of a flake in accordance with the invention wherein the frame depth is approximately twice the symbol depth.

FIG. 13a is an illustration of a cross section of a flake in accordance with the invention wherein the coating on the walls is thinner than the coating at the bottom.

FIG. 13b is an illustration of a cross section of a flake in accordance with the invention FIG. 14a is an illustration of a cross section of a flake groove wherein the coating is thicker at the upper wall than it is at the bottom of the trough of the groove conveniently assisting in the breakage of the flake along the groove.

FIG. 14b is an illustration of a groove defining a flake symbol illustrating the uniform coating thickness.

DETAILED DESCRIPTION OF THE INVENTION

Introduction

Flakes for covert security applications are not typically seen by casual observation. Some sort of inspection technique, such as inspection under a microscope or analytical technique, such as elemental analysis, is used. In one embodiment, opaque flakes containing indicia, such as a particular shape, substantially match the visual characteristics of a bulk pigment or other substance they are mixed with. In a particular embodiment, a single-layer inorganic opaque flake having a selected shape is mixed with an iridescent mica-based flake or other base pigment. For the purpose of this discussion, a "single layer" of inorganic material includes multiple layers of the same inorganic material built up upon each other.

Inorganic covert flakes are particularly desirable in applications where heat, solvents, sunlight, or other factors may degrade organic flakes. For example, an inorganic covert flake used in an explosive is detectable even after exposure to high temperatures and/or pressures, and is persistent in the environment. Flakes according to embodiments of the present invention also are substantially thinner, typically less than about 10 microns, than conventional shaped flakes, enabling their use in ink and produce a smooth surface finish in paints without having to use a clear topcoat. Thin, inorganic flakes according to embodiments of the present invention also have a density closer to the density of base pigment flakes made using similar techniques. Thick flakes incorporating organic substrates often have a different density than thin-film base pigment flake, and may segregate, either before or during application while the carrier is fluid. Flake segregation is undesirable because it can result in an inconsistent ratio of covert and base flakes in a composition, and may degrade the covert nature of the covert flakes if segregation results in an unduly high concentration of covert flakes.

II. Exemplary Opaque Flake

Figure 1:
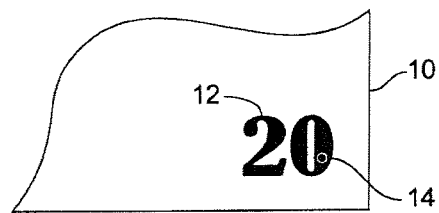
FIG. 1 is a plan view of a portion of a document with a security feature.

FIG. 1 is a plan view of a portion of a document 10 with a security feature 12 according to an embodiment of the present invention. At least a portion 14 of the security feature 12 is printed with ink or paint including opaque flakes having indicia (hereinafter "covert flakes") mixed with bulk pigment, such as bulk pigment flakes. In one embodiment, the covert flakes have a particular shape, such as being square, rectangular, trapezoidal, "diamond" shaped, or round, for example. In another embodiment, the covert flakes include a grating pattern, with or without having a selected shape. Preferably, the selected shape is provided by embossing, etching or using a laser to create frames or borders along which the flakes will fracture upon removal from their temporary supporting substrate. In a particular embodiment, the grating pattern has a grating spacing that is not optically active in the visible range of the spectrum. That is, these grating patterns do not form a visible diffraction grating. Covert flakes are also sometimes referred to as taggant flakes, although not all taggant flakes are necessarily covert flakes.

Generally, bulk pigment particles, including bulk pigment flakes, have an irregular shape. In one embodiment, the covert flakes are distinguishable from bulk pigment flakes by their shape. Alternatively, bulk pigment flakes have a first selected shape, and the covert flakes have a second selected shape. Production of shaped pigment flakes is accomplished by a variety of techniques, such as using a patterned substrate to deposit the flake material on the substrate and then separating the flake from the substrate to obtain the pattern such as a frame or border, or using a laser or other means to cut the patterned flakes from a sheet of flake material. The selected shape of the covert flakes may be associated with a manufacturing facility, date of manufacture, or other aspect of the document 10, or ink used in producing the document, for example.

A roll coater is one type of apparatus that can be used to produce selectively shaped or randomly shaped covert flakes according to embodiments of the invention. A roll of a sheet of polymer substrate material (also known as a "web") is passed through a deposition zone(s) and coated with one or more thin film layers. Multiple passes of the roll of polymer substrate back and forth through the deposition zone(s) may be made. The thin film layer(s) is then separated from the polymer substrate and processed into flake. Other apparatus and techniques may be used.

It is generally desirable to limit the total thickness of thin film layers deposited (and hence removed) from a roll of polymer film substrate to less than about 10 microns. PET is one type of polymer film substrate used in roll coaters, and the PET film substrate is usually at least about 13 microns thick. Thinner PET film tends to thermally deform during vacuum deposition processes. Both the heat in the deposition zone and the heat of condensation of the deposited thin-film layer(s) increase the temperature of the polymer substrate as it passes through a deposition zone. Thus, the minimum thickness of flake cut from and incorporating PET film is about 13 microns.

Figure 10:
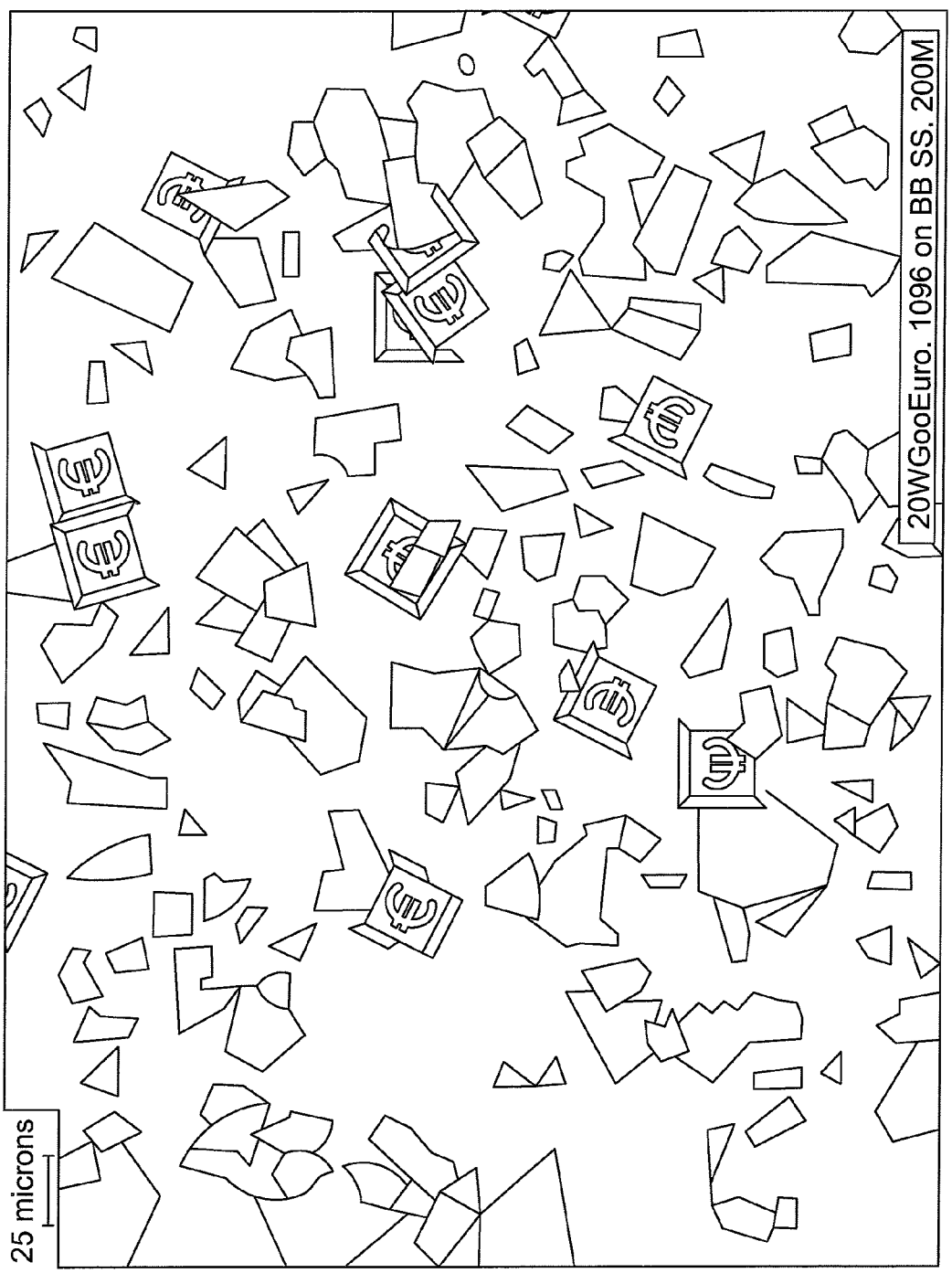
FIG. 10 is a photograph of a plurality of framed symbols within a greater number of flakes absent any covert symbols or frames where a ratio of framed symbols to other flakes is 1:10.

In addition to, flakes having a selected shape preferably realized by embossing frames into the substrate, along which the flakes will separate and break apart, the covert flakes preferably include a one or more symbols, other forms of indicia within and bordered by the frames, and/or a grating pattern. The grating pattern is embossed on a substrate used in a roll coater prior to depositing thin film layers that are processed into flakes, or otherwise formed. In a further embodiment, a selected amount (percentage) of the deposition substrate surface area is embossed with a grating pattern or shape pattern to obtain a selected amount of covert flakes when the thin film layers are stripped from the deposition substrate and processed into flakes. This technique provides covert flakes with the same optical design (thin film layer composition and thickness) as the base flake. For example, embossing 10% of the deposition substrate surface area with a grating pattern and/or shape pattern would result in a pigment mixture having about 10% covert flakes. FIG. 10 shows a blend of two different optical designs for the shaped/symboled flakes and for the unshaped/flat flakes. Two different optical designs in the same vacuum process could be done however this is not preferred. Preferably different rolls of deposition substrate are produced with different percentages of embossed surface area to obtain pigment mixtures having different amounts covert flake, or are embossed with different patterns to obtain different shapes and/or grating patterns.

Figure 2A:
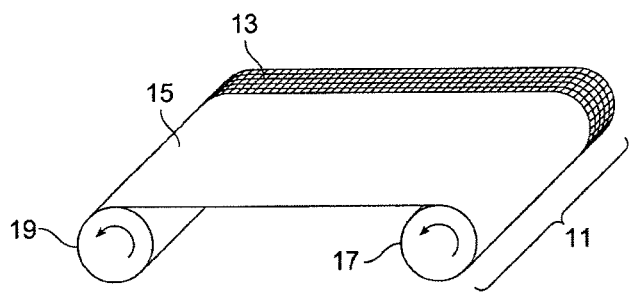
FIG. 2A is a simplified view of a portion of a deposition substrate having an embossed portion and a non-embossed portion.
Figure 2B:
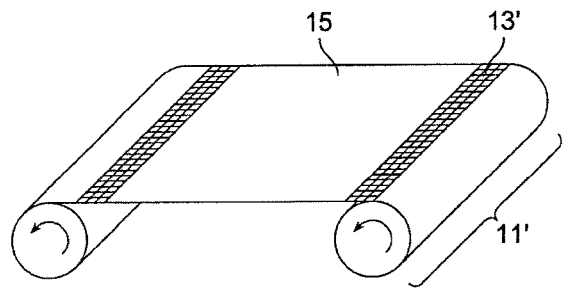
FIG. 2B is a simplified view of a portion of another deposition substrate 11' having an embossed portion 13' and a non-embossed portion 15

FIG. 2A is a simplified view of a portion of a deposition substrate 11 having an embossed portion 13 and a non-embossed portion 15. The embossed portion has a frame, which is exaggerated for purposes of illustration, and alternatively or optionally has a grating or symbol, for example, and the non-embossed portion is essentially smooth. Alternatively, the non-embossed portion is embossed with a different frame, grating, or symbol. The ratio of the surface area of the embossed portion 13 to the non-embossed portion 15 produces a selected amount of taggent flake (produced from the embossed portion) having the same thin-film structure as the base flake (produced from the non-embossed portion). The deposition substrate 1 travels from one roll 17 to another 19 through a deposition zone (not shown) in a roll coater, but alternative embodiments use different types of substrates and deposition systems. FIG. 2B is a simplified view of a portion of another deposition substrate 11' having an embossed portion 13' and a non-embossed portion 15'.

A pigment flake with identifying indicia provides a security feature even if it is easily observable; however, if a pigment flake with identifying indicia is not easily observable, a counterfeiter might not even be aware that a covert flake is present. One embodiment of the present invention uses covert pigment flake that has the same optical characteristics as the base pigment. The covert pigment flakes are not seen by unaided human vision, but are visible under magnification of about 50× to 1000×. Covert pigment flakes having essentially the same visual characteristics can be mixed with base pigment in a wide range of proportions without significantly affecting the color of the composition. In some embodiments, covert pigment flakes are readily identifiable in compositions having 5-10 weight % covert pigment flakes and 95-90 weight % base pigment flakes having similar appearance (e.g. color and/or color travel). Often, shaped opaque covert flakes are easily identifiable in the field using hand-held microscopes (e.g. "shirt-pocket" microscopes), and require less magnification to identify than similar sized flakes having symbols.

Another approach is to use an opaque covert flake with a selected shape that is a different color than the base flake. In one embodiment, the opaque covert flake is a bright metallic ("silver") flake having a thin-film layer of aluminum or other reflector between layers of a dielectric material, such as $MgF_2$. Bright flake is generally highly reflective over a wide range of visible wavelengths, and often does not have a characteristic color. Bright flake made with gold and copper may appear yellowish and reddish, for example. It has been found that between about 0.25 weight % to about 5 weight % of shaped (e.g. "diamond" shaped) bright flake in colored base pigments can be added without causing a noticeable change in color, but are still easily identifiable under illuminated magnification of about 50× (i.e. 50 times magnification). Under illuminated magnification, both the shape and high brightness of the flake distinguish it from the base flake. When less than about 0.25% of shaped bright flake is used the covert flakes become difficult to detect because dilution with the base flake results in fewer shaped bright flakes in the field of view.

When the amount of bright flake exceeds about 5 weight %, the color (e.g. hue) of certain types of flakes, particularly dark colored flakes, changes. In these instances, too much bright flake essentially "dilutes" the color of the base pigment. However, using shaped bright flake in compositions having color-shifting pigment is highly desirable because a single type of shaped bright flake is added in small quantities to many different types (color and/or color travel) of pigment flake, and a relatively small amount of shaped bright flake provides a covert security feature. Similarly, dilution of color is not critical in applications where compositions containing pigment and bright flake are not intended to replace or otherwise be indistinguishable from compositions containing 100% pigment flake.

Pigments are often mixed in carriers to form paint or ink. Examples of carriers include polyvinyl alcohol, polyvinyl acetate polyvinylpyrrolidone, poly(ethoxyethylene), poly (methoxyethylene), poly(acrylic) acid, poly(acrylamide), poly(oxyethylene), poly(maleic anhydride), hydroxyethyl cellulose, cellulose acetate, poly(saccharides) such as gum arabic and pectin, poly(acetals) such as polyvinylbutyral, poly(vinyl halides) such as polyvinyl chloride and polyvinylene chloride, poly(dienes) such as polybutadiene, poly (alkenes) such as polyethylene, poly(acrylates) such as polymethyl acrylate, poly(methacrylates) such as poly methylmethacrylate, poly(carbonates) such as poly(oxycarbonyl oxyhexamethylene, poly(esters) such as polyethylene terephthalate, poly(urethanes), poly(siloxanes), poly(sulphides), poly(sulphones), poly(vinylnitriles), poly(acrylonitriles), poly(styrene), poly(phenylenes) such as poly(2,5 dihydroxy-1,4-phenyleneethylene), poly(amides), natural rubbers, formaldehyde resins, other polymers and mixtures of polymers and polymers with solvents.

Figure 3A:
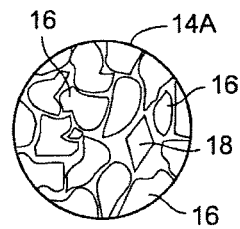
FIG. 3A is a simplified plan view of a portion 14A of the security feature 14 shown in FIG. 1.

FIG. 3A is a simplified plan view of a portion 14A of the security feature 14 shown in FIG. 1. The portion 14A of the security feature is viewed under magnification, typically about 20×-300×, in order to see the shape of the flakes, which are typically about 5-100 microns across, more typically about 20-40 microns across. The security feature was printed using ink including base pigment particles 16 and a covert pigment flake 18 having a selected shape, in this case a "diamond" shape. The optical characteristics and concentration of the covert pigment flake is chosen so as to not disturb the visual appearance of a composition made with the base pigment particles.

The base pigment particles 16 are illustrated as being irregularly shaped flakes. Alternatively, base pigment flakes have a selected (i.e. regular) shape. Similarly, the covert pigment flake 18 could have a grating. The addition of a grating further increases the difficulty of counterfeiting. In some embodiments, the covert pigment flake 18 has generally the same optical characteristics as the base pigment particles. Alternatively, the covert pigment flake 18 has different optical characteristics as the base pigment particles but is present in sufficiently small quantities so as not to disturb the visual appearance of a composition made with the base pigment particles.

In a particular embodiment, the "diamond-shaped" covert flakes were bright flakes about 25 microns by 35 microns across. The shaped flakes were made by embossing a diamond pattern into a roll of PET deposition substrate material, and then depositing a standard thin-film design for bright flake (e.g. about 100-60 nm of Al between layers of $MgF_2$ that are each about 400 nm thick). The total thickness for this bright flake is about 900 nm, which is about one micron. The embossed pattern is also known as a "frame" (as opposed to a grating which is intended to produce a pattern in or on the flake), and is positive in some embodiments and negative in other embodiments. Aside from the diamond flakes themselves offering some measure of a covert feature when distributed in some predetermined ratio with other irregular shaped flakes, the diamond-shaped flakes may be embossed with additional covert symbols, thereby providing two levels of covert features available to protect a device.

The combination of a metal layer with one or more dielectric layers facilitates removal of the flake from the deposition substrate. A thin film stack having only dielectric layers is brittle and often has residual stresses from the deposition process. Such thin film stacks tend to break more randomly, resulting in fewer shaped flakes. An all-metal stack or single layer is difficult to process into patterned flakes according to the frame of the deposition substrate because the metal is relatively ductile. In particular embodiments, metal-dielectric and dielectric-metal-dielectric flake having a total thickness of between about 0.5 microns and about 3 microns provides a good combination of ductile and brittle characteristics that result in good patterning of the flake when it is removed from the substrate and processed. In a particular embodiment, shaped bright flake having a total thickness of about one micron of a ductile metal layer between brittle dielectric layers yielded about 90% diamond-shaped flakes from an embossed deposition substrate.

The thin-film layers were stripped from the deposition substrate and processed into flake using conventional techniques. The embossed diamond pattern provided lines along which the thin-film layers broke into flakes having the selected diamond shape. In another embodiment, the diamond-shaped flakes were about 12 microns by 16 microns and included a grating on the major surface of the flakes. The grating was nominally 2000 lines/mm and did not produce a noticeable diffractive effect in a composition when used as a taggent. The shape of the 12-by-16 micron flake was easily seen at 100× magnification; however, the grating was not easily seen at this magnification. The grating was readily apparent at 400× magnification. In other embodiments, a grating is coarser, and is easily seen at the same magnification (e.g. 50× to 100×) that is used to discern the shape of the taggent flakes. Thus, gratings used to provide a security feature to taggent flakes do not have to be optically active in the visible portion of the spectrum.

In a particular embodiment, the base pigment particles are flakes of mica coated with a layer of $TiO_2$ or other dielectric material. The coating material typically has a relatively high index of refraction. Mica is a naturally occurring mineral that is relatively inexpensive and easily processed into flake substrate. When mica flake substrate is coated with a layer of high-index material of a selected thickness, a nacreous pigment flake is obtained. Mica flake substrate can be coated with several alternative materials using a variety of processes. Such pigments are commonly known as "mica-based" pigments. A photocopy of an image printed with such nacreous pigment does not look like the original, thus mica-based pigment flakes are desirable for use to provide overt security features. However, shaping mica flake substrate or providing a symbol on mica flake substrate is impractical. Covert flake according to an embodiment of the present invention is mixed with the mica-based pigment to enable a covert security feature to be included in images printed with mica-based pigment flakes. Shaped pigment flakes made of a single layer of inorganic dielectric material, such as $TiO_2$ or ZnS, have an appearance similar to a mica-based pigment if the covert pigment flake has a thickness about five times the quarter-wave optical thickness ("QWOT") at a wavelength in the visible spectrum. Typically, a single-layer covert flake of ZnS intended to match the appearance of a mica-based pigment has a thickness of about 60 nm to about 600 nm. Processing all-dielectric flake from a deposition substrate having an embossed diamond-shaped pattern tends to have a lower yield than a counterpart metal-dielectric flake.

Figure 3B:
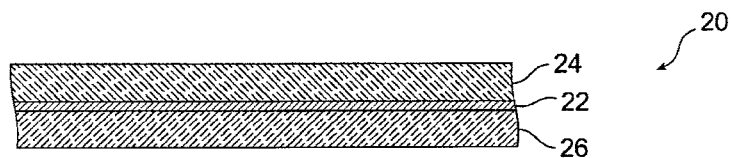
FIG. 3B is a simplified cross section of a bright pigment flake.

FIG. 3B is a simplified cross section of a bright pigment flake 20 according to an embodiment of the present invention. A reflective layer 22 is between two dielectric thin-film layers 24, 26. The dielectric thin-film layers 24, 26, provide stiffness to the bright pigment flake 20 and facilitate removal of the pigment flake from the roll coater substrate. It is desirable to keep the bright pigment flake less than 10 microns thick to provide a composition that dries or cures to a smooth surface. In particular embodiments, the thickness of the flake is between about 1 micron and about 3 microns. Thinner flakes tend to be more difficult to process and handle because they weigh so little, and thicker flakes are stronger, and hence more difficult to break along the frame pattern.

The reflective layer 22 is typically a thin-film layer of a highly reflective metal such as aluminum, platinum, gold, silver, or copper, or a moderately reflective metal, such as iron or chromium. The reflective layer 22 is sufficiently thick to be opaque (reflective) in the visible portion of the spectrum, but not so thick as to interfere with separation of the thin-film layers from the substrate and subsequent processing into flake. In other words, a metal reflective layer that was too thick would provide a ductile layer between the relatively brittle dielectric layers 24, 26 and tend to interfere with processing the deposited layers into flakes. Suitable materials for the dielectric layers include ZnS, $MgF_2$, $SiO_2$, $Al_2O_3$, $TiO_2$, $Nb_2O_5$, and $Ta_2O_5$, among others. In some embodiments, the dielectric thin-film layers 24, 26 also provide environmental protection for the reflective layer 22.

The bright flake 20 has a selected shape, and optionally or alternatively has other indicia, such as a surface (grating) pattern or an elemental fingerprint. In sufficiently low concentrations, the bright flake 20 is added to colored pigment and colored compositions (e.g. inks and paints). Shaped bright flake can be added to base (i.e. randomly shaped or alternatively shaped) bright flake as a covert security feature.

Figure 3C:
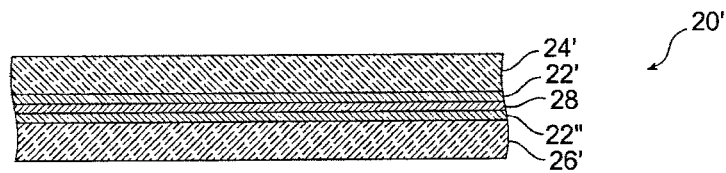
FIG. 3C is a simplified cross section of a bright flake 20' providing an elemental fingerprint.

FIG. 3C is a simplified cross section of a bright flake 20' with an elemental indicator layer 28. The bright flake 20' has reflective layers 22', 22" between dielectric layers 24', 26', and a layer 28 providing an elemental indicator. The elemental indicator layer 28 is a layer of material that is not found in a base pigment that the bright flake will be used with, and that is readily detectable using elemental analysis techniques, such as secondary ion mass spectrometry ("SIMS"), energy dispersive X-ray ("EDX") and Auger analysis. Furthermore, the elemental indicator is present in the covert flake but not in the base flake, and micro-SIMS, micro-EDX or micro-Auger analysis easily detects this difference. Merely adding the indicating element to the pigment mixture (e.g. adding a small amount of a compound containing the indicating element to the carrier) would not overcome this security feature.

The elemental indicator layer 28 is not optically active because it is between the two opaque reflective layers 22', 22". The reflective layers 22', 22" are selected to be of the same material used in the base flake, such as aluminum. Suitable materials for an elemental indicator include platinum, iridium, osmium, vanadium, cobalt, and tungsten, among others. Those of skill in the art appreciate that the elemental indicator material chosen depends on the base pigment it will be used with. In an alternative embodiment, the reflective layer of bright pigment is of an elemental indicator material (see FIG. 3B, ref. num. 22). For example, covert bright or colored pigment flake using platinum as the reflective layer is mixed with base bright flake or colored pigment flake using aluminum as the reflective layer. In a further embodiment, the amount of flake having the elemental indicator incorporated into a pigment mixture or composition is chosen to provide a selected elemental ratio (e.g. aluminum to platinum) in the pigment mixture. In an alternative or further embodiment, the material of the dielectric thin-film layers 24', 26' (FIG. 3B, ref. nums. 24, 26) is chosen to provide an elemental indicator.

Figure 3D:
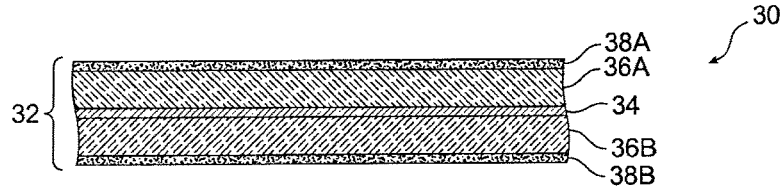
FIG. 3D is a simplified cross section of a color-shifting pigment flake 30 according to another embodiment of the present invention.

FIG. 3D is a simplified cross section of a color-shifting pigment flake 30 according to another embodiment of the present invention. The color-shifting pigment flake 30 is generally known as a symmetrical 5-layer Fabry-Perot interference flake. A thin film stack 32 includes a reflective metal layer 34, two spacer layers 36A, 36B, and two absorber layers 38A, 38B. The absorber layers are typically very thin, semi-opaque layers of chromium, carbon, or other material. The reflector, spacer, and absorber layers are all optically active, that is, they contribute to the optical performance of the color-shifting pigment flake. Each side of the flake provides similar Fabry-Perot interference structures to incident light, and hence the flake is optically symmetrical. Alternatively, the color-shifting pigment flake is an all-dielectric pigment flake or a 3 layer flake such as an absorber/dielectric/absorber.

The color and color travel of the color-shifting pigment flake is determined by the optical design of the flake, namely the material and thicknesses of the layers in the thin film stack 32, as is well-known in the art of optically variable pigments. The optical design of the color-shifting pigment flake 30 is typically chosen to match the optical properties of the base pigment flake that it will be mixed with. The color-shifting pigment flake 30 is shaped (see FIG. 3A, ref. num. 18), and optionally or alternatively includes other indicia, such as a surface grating pattern and/or elemental indicator.

For example, the reflective layer includes an elemental indicator, either a reflective metal that is different than the base pigment flakes, or includes an additional elemental indicator layer(s), which may or may not be optically active (see FIG. 3C, ref. num. 28). Alternatively or additionally, the spacer layers 36A, 36B and/or the absorber layers 38A, 38B include an elemental indicator. For example, if the base pigment flake uses $MgF_2$, $SiO_2$, or $Al_2O_3$ as a spacer layer material, the covert pigment flake 30 uses different spacer layer material, such as $TiO_2$ or ZnS. Spacer and/or absorber indicator materials include elements that are easily detected using elemental analysis.

In some embodiments, using a different spacer material and/or reflector material results in a covert pigment flake 30 that has different optical properties than the base flake. For example, even if the covert and base flakes have similar color at normal incidence, the color travel might be different. Generally, low-index spacer materials (such as $MgF_2$ and $SiO_2$) provide more color travel ("fast shifting" pigments) than high-index spacer materials (such as ZnS and $TiO_2$). However, such covert flakes can be added in relatively high concentrations to the base pigment flake, even if the color travel does not precisely match that of the base flake, because most casual observers cannot detect the difference between a mixture according to an embodiment of the invention and 100% base flake.

Figure 4:
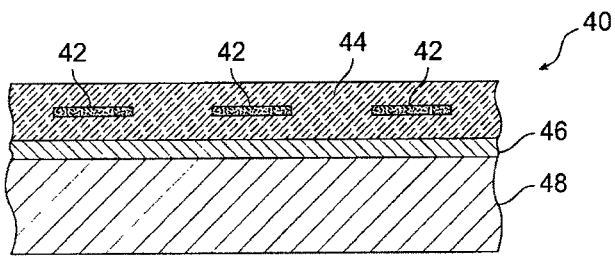
FIG. 4 is a cross section of a varnish with opaque covert flakes dispersed in a carrier according to an embodiment of the present invention.

FIG. 4 is a cross section of a varnish 40 with covert flakes 42 dispersed in a carrier 44 according to an embodiment of the present invention. The carrier is clear or tinted, and the covert flakes 42 are at a concentration selected to avoid casual visual detection. An optional color coat or bright (e.g. "chromed") coating 46 has been applied to an object 48 underneath the varnish 40. The varnish 40 provides a covert security feature to the object without disturbing its appearance. In a particular embodiment, the optional color coat 46 is an image printed with nacreous or color-shifting pigment to provide an overt security feature to the object. The object is a document, product, packaging, or seal, for example. The varnish 40 enables providing a covert security feature to an object that already has a covert security feature without significantly altering the appearance of the object. For example, if stock certificates have been printed with overt security features and it subsequently becomes desirable to provide a covert security feature to the stock certificates, the overt security feature is over-printed with the varnish 40 or a similar ink composition (i.e. an essentially clear ink composition containing covert flakes). In another embodiment, an additional covert security feature is provided to an object already having one or more covert security features. In a particular embodiment, the covert flakes make up not more than 2% of the varnish.

Figure 5:
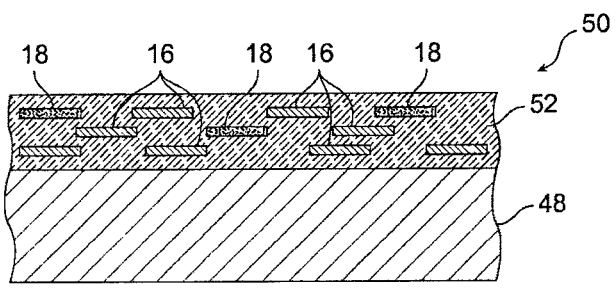
FIG. 5 is a cross section of base flakes and opaque covert flakes dispersed in a binder according to another embodiment of the present invention.

FIG. 5 is a cross section of a composition 50 (e.g. ink or paint) including base pigment flakes 16 and shaped covert flakes 18 dispersed in a binder or carrier 52 according to another embodiment of the present invention. The covert flakes 18 have a selected shape or other indicia, such as an elemental indicator or a surface grating pattern. The composition 50 has been applied to an object 48, such as a label, product packaging, bank note, or consumer item.

Adding covert flake to an existing ink or paint composition provides a covert security feature to images made of the ink or paint. For example, ink with color-shifting pigment is used to provide a color-shifting image as an overt security feature on a bank note or other object. Covert flake according to an embodiment of the present invention is added to the ink, and the resultant mixture is used to print images that appear substantially similar as those printed with the original ink. Thus, a casual observer of the bank note does not notice a change in the appearance of the overt security feature (i.e. color-shifting image) after the covert security feature is added. The indicia of the covert flake indicates a date-of-manufacture, a printing location, and/or the source (manufacturer) of the ink, for example.

III. Experimental Results

A test standard using 100% magenta-to-green optically variable intaglio ("OVI") pigment flake was produced and measured. Both bright and optically variable taggant samples had a grating pattern of 2000 lines/mm, which made the taggant flakes easier to distinguish from the base pigment flake (i.e. locate) and more difficult to counterfeit. The grating pattern was clearly visible at about 400×, and did not induce visible diffractive properties to images printed with the test compositions. It is believed that the low portion of the taggent flakes in combination with not being well oriented to the viewer avoided a diffractive effect from occurring. In an alternative embodiment, a finer grating pattern is included on shaped taggent flakes. The shapes are identifiable under a microscope at a first magnification, but the grating pattern is not easily seen at this first magnification. The grating pattern is seen at a higher magnification. It is believed that including such a grating pattern to taggent flake having a selected shape or symbol further enhances the covert nature of the taggent flake because a counterfeiter might see the shape or a symbol under microscopic examination, but not see the grating pattern, and hence not include it in a counterfeit article.

The first test sample ("sample 1") contained 90% (by weight) of the conventional (base) magenta-to-green pigment flake mixed with 10% magenta-to-green OVI pigment flake with a grating ("taggent flake"). The taggent flakes were easy to detect by routine microscopic inspection, and the color performance of the mixture was the same as the test standard because the color of the taggent flake was well matched to the color of the base flake. Close color matching involves careful monitoring of the production of the taggent flake and a new optical design for each color of taggent flake would generally be used to match each color of base flake.

Another approach is to use a standard taggent flake design that can be used with many different colors of base flake. Bright taggent flake using an aluminum reflector layer (giving the flake a "silver" appearance) was also evaluated. Fabrication of bright flake is relatively simple and these flakes were very easy to detect at a concentration of 5% when mixed with colored base pigment flakes. Bright taggent flakes are used with many colors of base pigment to provide covet security features. The amount of bright taggent flakes in the composition depends on the desired result. For example, the color performance of an intaglio blend containing 5% bright taggent flake mixed with the magenta-to-green OVI base is distinguishable in a side-by-side comparison from a composition of 100% magenta-to-green OVI flake. A composition essentially indistinguishable from 100% magenta-to-green OVI flake uses less than 5% bright flake, such as compositions with concentrations between about 0.25 weight % and 3 weight % of bright taggent flake in magenta-to-green OVI flake. It is believed that bright flake in concentrations greater than 5% may be added to pigment flake providing lighter or less saturated color without noticeably changing the appearance of the composition. Bright taggent flakes are easy to detect under modest magnification, even at concentrations below 1%, because of the combination of having a selected shape and of being a different color (e.g. "silver" instead of magenta).

IV. Exemplary Methods

Figure 6:
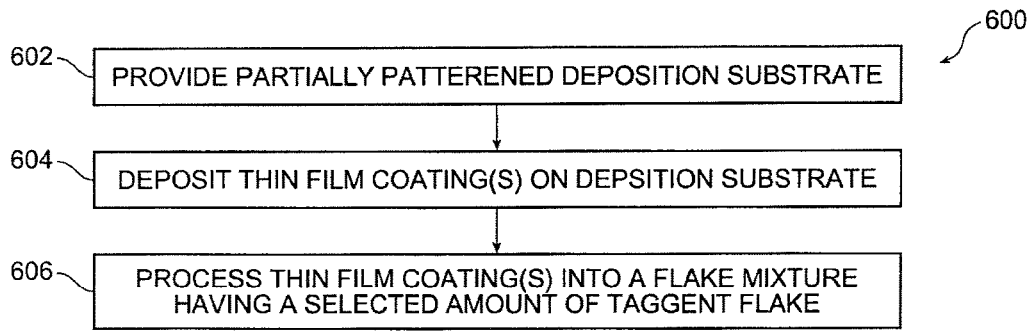
FIG. 6 is a flow chart of a method of making pigment flake according to an embodiment of the present invention.

FIG. 6 is a flow chart of a method 600 of making pigment flake according to an embodiment of the present invention. A roll substrate having a non-embossed ("smooth") portion and an embossed portion in a selected ratio of the deposition surface area of the roll substrate is provided (step 602). In one embodiment, the embossed portion is embossed with a frame for producing flakes having a selected shape. In an alternative embodiment, the embossed portion is embossed with a grating pattern or symbol. In an alternative embodiment, the substrate is patterned using a process other than embossing, such as laser ablation. At least one thin film layer is deposited on the roll substrate (step 604), and the deposited thin film layer(s) is processed into flake (step 606) to result in a flake mixture having a selected amount of taggent flakes. The yield of taggent flake depends on factors such as the type of thin-film layers being processed, the nature of the frame, grating pattern, or symbol, and processing parameters.

For example, referring to FIGS. 2A and 2B, if 10% of the surface of the roll substrate is embossed with a grating or symbol, then a yield of approximately 10% taggent flake having the grating pattern or symbol is expected. If 10% of the surface of the roll substrate is embossed with a diamond-shaped frame, then a yield of about 9% is expected for dielectric-metal-dielectric flake because of the 10% yield loss processing the patterned portion of the thin film stack into shaped flakes. Similarly, a yield of about 5% is expected for shaped all-dielectric flake because of the 50% yield loss processing the patterned portion of the thin film stack into shaped flakes.

While the invention has been described above in terms of various specific embodiments, an aspect of the invention which provides significant advantages will now be described.

For example an embodiment of this invention which offers significant advantages is the aspect of using frames or borders framing symbols or indicia framed by these borders on a substrate material used to form a coating upon.

Figure 7:
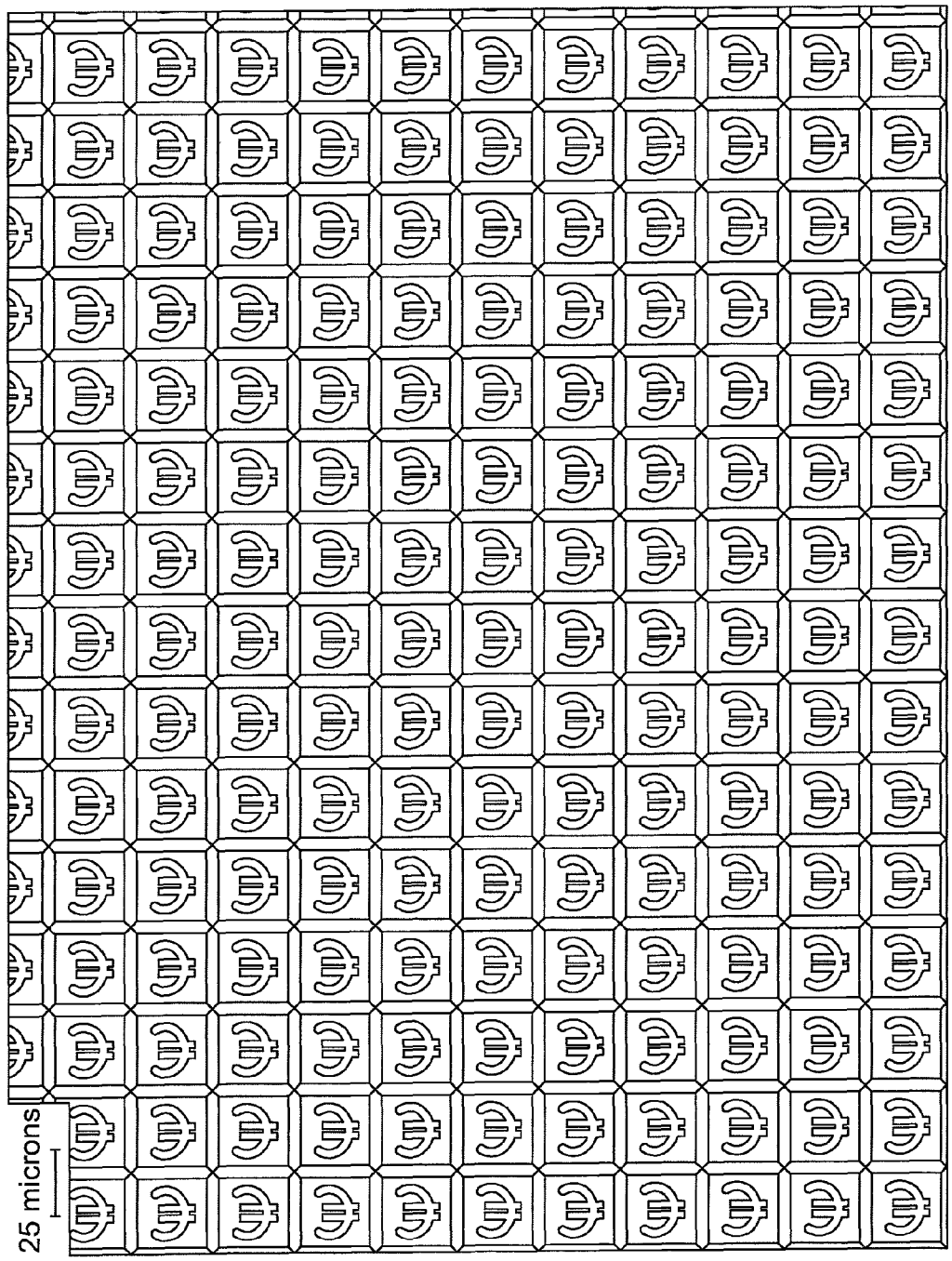
FIG. 7 is a photograph of a sheet bearing a plurality of Euro symbols each framed by a square frame or border embossed into the substrate.
Figure 8:
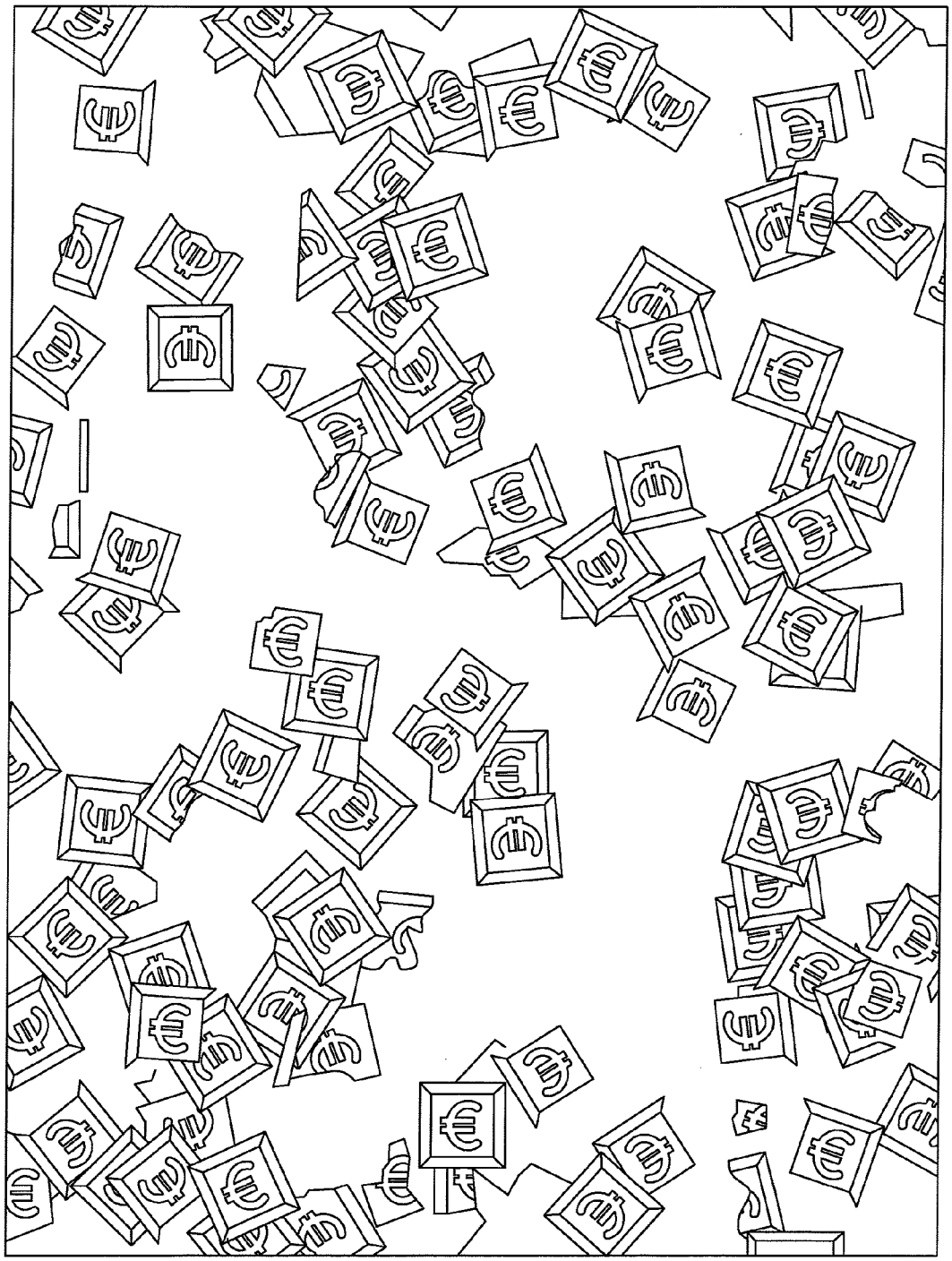
FIG. 8 is a photograph of a plurality of Mg-Gn color shifting flakes each bearing the Euro symbol and most having a full or partial frame surrounding the symbol.

Turning now to FIG. 7, a photograph is shown of sheet bearing a plurality of Euro symbols wherein each € symbol on the sheet has an embossed border around it. This is generally accomplished by embossing an organic substrate, such as a PET substrate with the framed € symbols, and subsequently coating the substrate with a removable coating. FIG. 8 is a photograph of the flakes after separation from their backing or substrate. This photograph clearly shows most of the symbols to be intact with few cracks appearing into or through the symbols. By using this invention, a very small portion of the flakes in the figure are broken in such a manner as to obscure the € symbol. However what is shown is that the frames are not present along all sides of all flakes after the flakes break apart from the substrate they were deposited on. Some flakes have no borders and others may have one and up to four borders. However, this is understandable. Since a frame border separates the flake from its nearest neighbour, when the flakes separate the border generally remains attached to one flake an not its adjacent flake on the other side of that frame border. However the existence of the frame or border results in most of the flakes breaking upon frame lines, on one side of the frame or the other providing relatively uniform flakes with relatively straight edges. More often than not, each flake bearing a symbol will have at least one border or frame segment attached to it after separating from the web or substrate it was deposited on. Preferably the frame is more severable than other parts of the flake.

Figure 9:
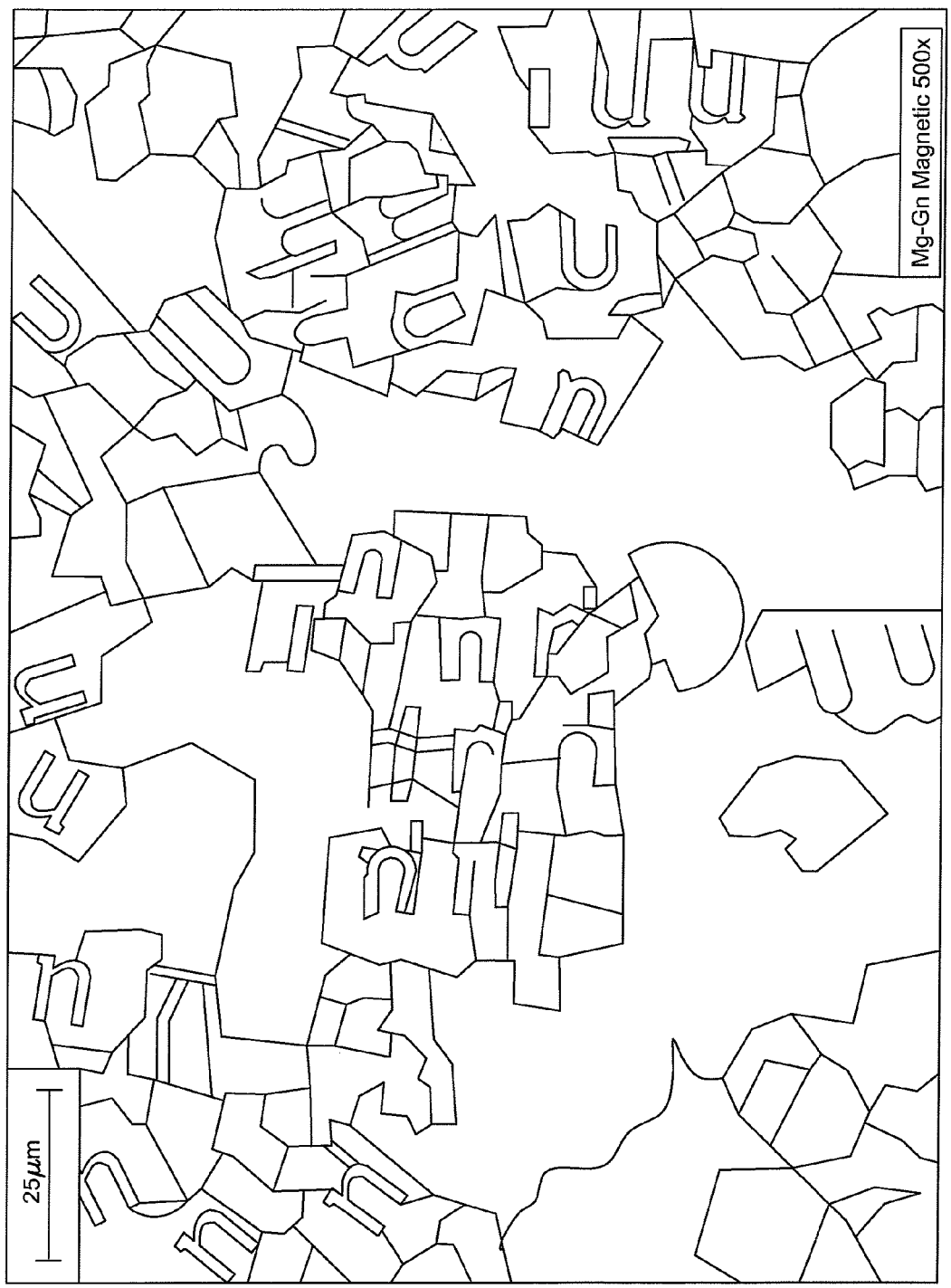
FIG. 9 is a photograph of a plurality of Mg-Gn µ symbols on flakes wherein the flakes have broken randomly preserving some symbols and destroying others due to the fracture lines as a result of the absence of frames.

FIG. 9 is a photograph of a plurality of Mg-Gn flakes bearing µ symbols wherein the flakes have broken randomly preserving some symbols and destroying others, due to stress cracks and resulting apparently random fracture lines as a result of the absence of frames. FIG. 9 illustrates stress cracks throughout the flakes causing the flakes to separate as a function of these cracks. Furthermore, cracks continue to appear within flakes thereby obscuring symbols. The provision of frames in accordance with this invention does not entirely prevent stress cracks, however provides a means in which these cracks can be controlled to a greater extent, so as to occur or be preferentially routed along the frame lines. In contrast to FIG. 9, the embodiment of this invention shown in conjunction with FIGS. 7 and 8 offers a manner in which the flakes can be separated along predetermined borders thereby preserving the shape and integrity of the symbols on the flakes to a much higher degree and generally does obscure the covert symbol within the flake.

The cracks that do appear in the non-framed symbols appear and propagate in the more fragile, glass-like, dielectric material but are stopped and rerouted to continue their propagation along the frame lines provided in the sheet of framed symbols shown in FIG. 7. The provision of frames produces the preferential rupture of the flakes along frame lines. Most of the cracks observed in the flakes of FIG. 8 do not go all the way through the total thickness of the flakes, but are stopped at the level of the more elastic metallic core (Al/Ni/Al) of the flakes producing a shadowing effect detrimental to the readability of the originally embossed symbols.

The flakes in both FIGS. 8 and 9 are about 1300 nm or 1.3 microns in thickness and have a layer structure of 10 nm Cr/480 nm MgF2/80 nm Al/50 nm Ni/80 nm Al 480 nm MgF2/10 nm Cr. Ni is present to provide the magnetic layer for overt features.

Turning now to FIG. 10 is a photograph of a plurality of framed symbols within a greater number of flakes absent any covert symbols or frames where a ratio of framed symbols to other flakes is 1:10. There are two interesting aspects of this embodiment. On a first level of detection, one, equipped with a 100× hand held microscope can detect the presence of covert flakes with a Euro symbol thereon, and furthermore, one can also quickly approximate that the ratio of covert to non-covert symbols is about 1:10. Yet still further, one can compare the ratio of square symbols to randomly shaped flakes to provide some measure of authentication. Therefore, shape, distribution, and identification of the symbols within framed shapes can be used to determine if the coating is authentic within some range of assurance.

Although flakes having symbols framed by borders or frames often break into desired shapes along the frame lines or grooves, as the framed Euro's indicate in FIG. 10, there are instances where flakes undesirably break apart along the embossed lines forming the symbols.

Figure 11A:
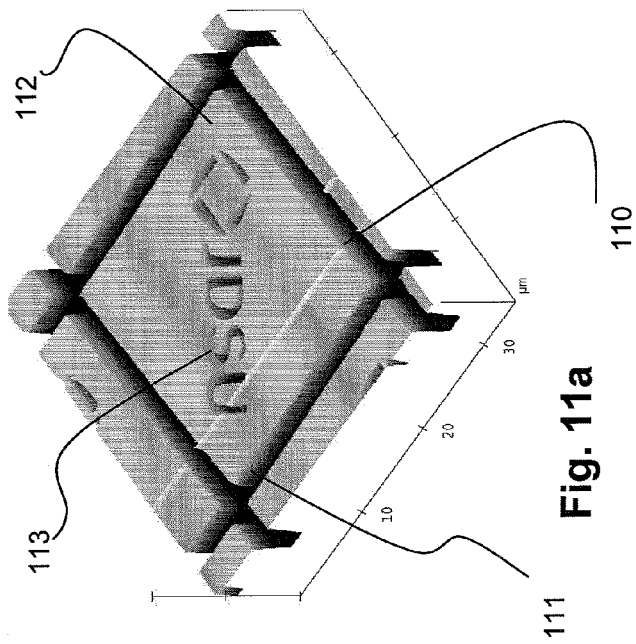
FIG. 11a is an isometric view of a cut-away embossed substrate illustrating the depth of frame grooves within the substrate.
Figure 11B:
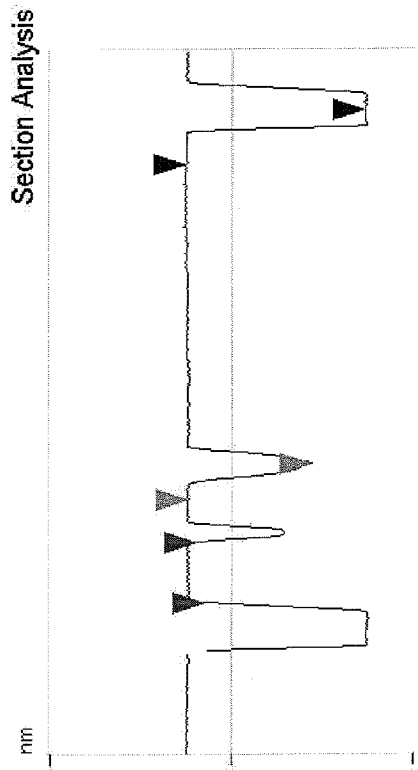
Figure 11C:
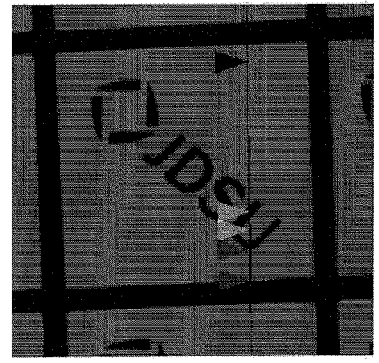

Referring now to FIG. 11*a*, a cut-away section of a substrate 110 defining only a portion of an array is shown, more particularly the substrate for one full flake and partial regions adjacent thereto where other flakes would be formed is visible. In this exemplary embodiment since it is desired for bordered or framed flakes carrying the word "JDSU" and accompanying logo to break apart along frame boundaries 111 so that the flakes are square in shape, the depth of the groove 111 forming the border or frame 111 is substantially deeper, than the groove forming the logo 112 or text 113. It is preferred that the ratio of the depth of the frame and the logo or text be at least 10:8 and preferably a greater to ensure that the flakes are broken and sever along the frame boundaries, that is, within the frame groove. FIG. 11*b* is a section analysis indicating the relative depths of the embossing on the substrate. The groove defining the frame is U-shaped and wider than the grooves defining the logo and text which are V-shaped and narrower. It is preferred that the coating material that coats the substrate and forms the flake fills more of the groove of the text and logo than the groove of the frame. This increases the fracturability of the frame and lessens the fracturability along the groove defining text or logo. FIG. 11*c* corresponds to FIGS. 11*a* and 11*b* and is a normal view of the substrate.

In contrast to FIG. 11*a*, FIG. 11*d* is a substrate in mirror image relief wherein the frame is defined by walls and wherein the text and logo are projecting out of the base of the substrate. FIG. 11*e* shows the relative height of these walls and FIG. 11*f* is a normal view of the substrate. When the sheet of flakes is removed from the substrate the logo and frames are still defined by walls.

FIG. 12*a* is a cross sectional view of a prior art framed flake wherein the grooves defining indicia in the form of letters or logo and the groove defining the frame are the same depth. Although the full double walled U-shaped frame is shown to illustrate the difference between FIG. 12*a* and FIG. 12*b*, after the flake is separated from its substrate, it would typically not have a double walled U-shaped frame as the flake should fracture along the frame channel. Dashed lines are shown to indicate where the flake would be expected to sever when separated from the substrate. However, since the groove depth in FIG. 12*a* is the same for the groove and for the symbols, it is likely that some flakes will sever along the symbol grooves. As can be seen when viewing FIG. 12*b*, the height or depth of the grooves defining the symbols is approximately one half of the height or depth of the groove defining the frame. That is, the frames are deeper than the symbols. This ensures that most of the flakes will sever along the frame grooves and not along the symbol grooves. In general it is preferred that the ratio of the frame groove to symbol groove be at least 3:2 and preferably 4:2 or greater.

The flakes in FIGS. 12*a* and 12*b* are shown to have a uniform coating wherein the thickness of the flake is substantially the same on the top, bottom and sidewalls.

Using a physical vapor deposition (PVD) technique of coating, i.e. evaporating or sputtering the material impinging upon the substrate at normal or near normal trajectory to the substrate results in the deposited layer having the same thickness on the top, bottom and sidewalls. However, in practice, PVD deposition produces atoms incident on the substrate at oblique angles as is shown in FIG. 13*b* and these oblique trajectories create anomalies resulting in variance in the thickness. For extreme oblique trajectories the opening to the groove in the deeper grooves will have a thinner coating than the bottom, which is desired in this instance where the goal is to have the flake fracture along the groove.

The higher aspect ratio, the larger will be the difference in between bottom, top and sidewalls of the features. This phenomenon is well known in the manufacturing of semiconductors devices with high aspect ratio features.

The breakage of flakes can occur through different mechanisms.

Attrition is breakage that is produced by the application of forces parallel to the surface of the flake. Cutting is breakage produced by the application of a shearing force to the flake. Compression or impact is breakage produced by the application of a force perpendicular to the flake surface. Frequently breakage can be due to a combination of these mechanisms. These mechanisms can take place during post processing of the flakes and coating application processes. For example, material milling can occur during the mixing operations in liquid phase (particle-to-particle interactions and/or attrition) necessary to improve uniformity of inks and paints.

Mechanically induced attrition and cutting by mechanical shearing often occurs during certain printing application when flakes are forced to pass through screens. Examples of this would be the interaction of flakes in an ink with blades in an annilox system during a flexo or gravure printing application or during a rotary silk screen application where a squeegee is forcing the flakes of the ink through a screen. This interaction is similar to the method used in a milling method called "knife milling". In this method, the milling action is obtained by a rotating assembly that uses knives or blades to cut the particles.

Impact milling can occur by high speed mechanical interaction with other flakes or with equipment used in post-processing and coating.

Notwithstanding, surface irregularities will concentrate the load applied to the flakes creating a condition of non-uniform load distribution.

This non-uniform loading distribution is shown if FIG. 14*a*. There is a localized difference in energy applied depending on the position of a point (area) of rupture on the flake. For example if one considers breakage by attrition, the shear stress developed at the bottom of the deep feature indicated by region 1 is higher than on the bottom of a shadow feature shown in region 2 of FIG. 14*b*. Furthermore, as was explained above, it is expected that the microstructure at the bottom of a deep feature is more fragile than the one for a shadow feature.

Figure 15:
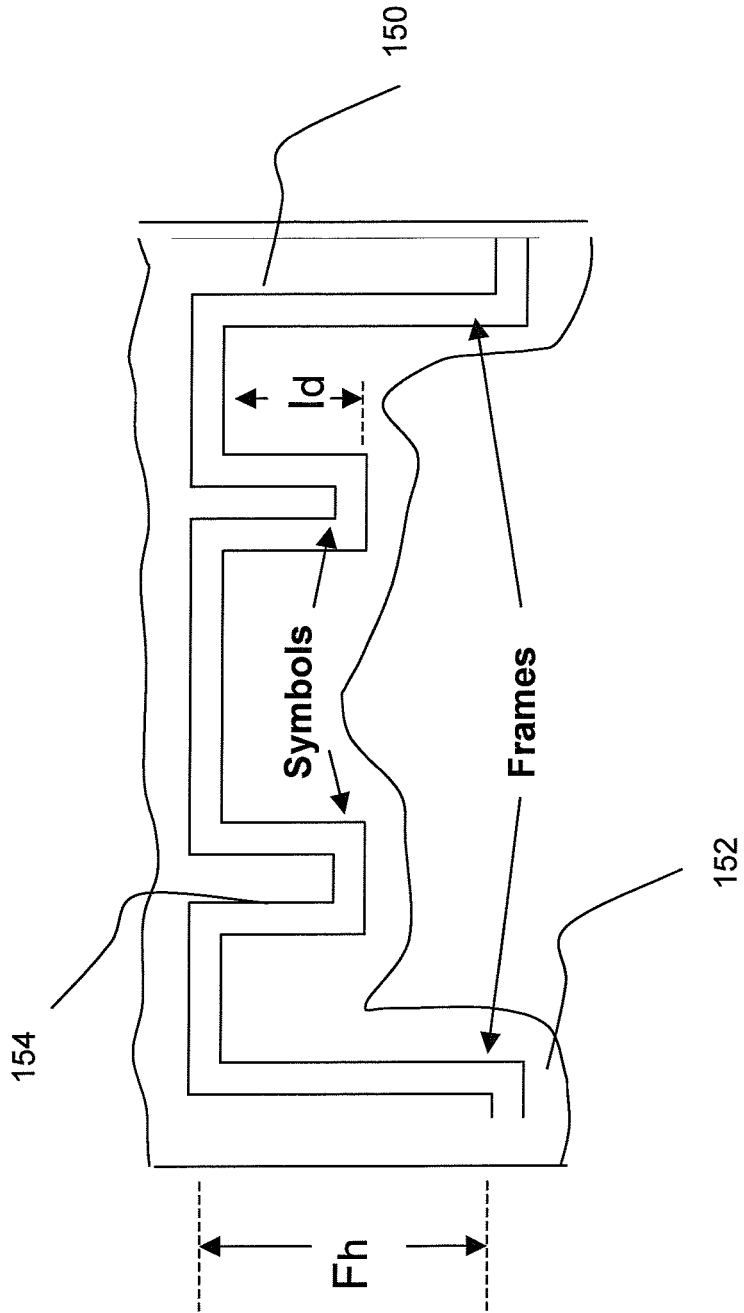
FIG. 15 is in illustration of a flake in accordance with the invention wherein the flake is encapsulated in a light transmissive protective coating.

Although this invention provides a way in which to facilitate breakage of flakes along frame lines rather than along indicia lines or grooves, an embodiment described hereafter protects the flakes after they have been separated from the substrate to prevent further unwanted breakage. FIG. 15 shows a flake that has been encapsulated in a protective coating.

In this embodiment the flakes can be coated with a high dielectric index material such as ZnS, TiO2, SiOx, Al2O3, etc., or a dielectric/metal multilayer flake can be coated with a semi-transparent material such as sol-gel (SiOx) which enhances observation of symbols. If the flake is made with a low refractive index material n<1.65, encapsulating the flake with a high refractive index material, i.e. n greater or equal to 1.65 can produce a microstructured flake with dichroic properties. This embodiment is essentially a stack of alternating High/Low/High all dielectric layers forming a shaped/symboled flake with covert functionality and also a visual optical effect similar to the pearlescent pigments.

Advantageously, an encapsulation process will not only improve the durability of the flakes but can also provide additional functionally to the microstructured flakes. It is well known that in opposition to vacuum vapor deposition technologies (PVD or CVD), encapsulation by sol-gel or other wet chemistry methods are non-surface conforming. For example this is used in ophthalmologic optical coatings to mask scratches or other surface defects during molding processes of lenses.

Encapsulation by a non-conforming coating in a wet chemistry process will tend to fill voids such as grooves present in embossed flakes, decreasing the non-uniform load on the already fragile regions of the flakes to improve breakage properties. In contrast, a conforming coating is a coating that will have substantially the same thickness everywhere independently of the microstructure of the substrate where the layer(s) are deposited. A non-conforming coating, for example a wet chemistry coating, will have the tendency to fill the gaps in the microstructure and therefore "planarize" the flakes. This is highly advantageous as it provides the benefits of having had the flake embossed so that the visual effect can be seen, and wherein the flake is then planarized in such a manner as to preserve or enhance the visual effect.

Coating embossed flakes in this manner has particular applicability to "edible flakes" for example, for use in the pharmaceutical and food industries. Materials, many of which are FDA approved for consumption, used in "edible flakes", include dielectric materials such as SiOx, TiOx, AlOx, FeOx). However these materials are more brittle than metallic or polymeric materials and we have found that fabricating "edible charms" or "edible flakes" as they are more commonly known, in accordance with the teachings within this invention, wherein frames are more fracturable than the indicia within flakes, and coating these more brittle flakes with sol-gel or an other protective coating is highly advantageous preventing some breakage that would likely otherwise occur during post processing.

The improvement of the breakage properties is also seen in coating flakes with semitransparent ductile materials by the encapsulation method. In this instance flakes are coated by deposition of thin layers of soft polymeric semitransparent materials under vacuum. One suitable deposition process is the so called Plasma Polymerization. This process is well known for coating SiOxHy, TiOxHy or COxHy which is a variation of Plasma Enhanced CVD of SiO2, TiO2 and Diamond like carbon. In addition some polymers can be Physical Vapor Deposited Evaporated or even sputtered to create functionality or improve durability of microstructured covert taggants.

What is claimed is:

1. A plurality of pigment taggent flakes, each flake having a first surface;
    an indicia defined by one or more regions having a second surface extending in a first direction with respect to the first surface to a maximum distance $I_d$ from the first surface, and
    a frame defined by one or more walls disposed at a periphery of the flake so as to at least partially surround the indicia, each wall extending in the first direction to a distance of at least $F_h$ from the first surface, where $F_h > I_d$.

2. A plurality of pigment taggent flakes as defined in claim 1, wherein each flake is in the shape of a polygon, wherein the frame has at least two walls.

3. The plurality of pigment taggent flakes of claim 1, wherein the distances $I_d$ and $F_h$ are each greater than a thickness of a material forming the pigment taggent flake.

4. The plurality of pigment taggent flakes of claim 1, wherein a thickness of a material forming each pigment taggent flake is substantially uniform throughout the taggent flake.

5. The plurality of pigment taggent flakes of claim 1, wherein the frame comprises a structure extending substantially perpendicularly to the one or more walls and substantially parallel to the first surface.

6. A plurality of pigment taggent flakes as defined in claim 2 wherein the indicia includes a symbol or logo, and wherein the walls each follow straight lines.

7. A plurality of pigment taggent flakes as defined in claim 2 wherein each of the flakes has a same symbol or logo.

8. A plurality of pigment taggent flakes as defined in claim 2 wherein $F_h/I_d$ is at least 1.5.

9. A plurality of pigment taggent flakes as defined in claim 2 wherein each flake is encapsulated in a coating.

10. A plurality of pigment taggent flakes as defined in claim 9 wherein the coating is selected from the group of metals, metal compounds, oxides, nitrates, polymers, and cermets.

11. A plurality of pigment taggent flakes as defined in claim 2 wherein the indicia comprises one or more V-shaped grooves.

12. A plurality of pigment taggent flakes as defined in claim 11 wherein the walls have a surface which extends substantially perpendicularly with respect to the first surface.

13. A plurality of pigment taggent flakes as defined in claim 2 wherein the indicia can only be seen with magnification.

14. A plurality of pigment taggent flakes as defined in claim 2 wherein each flake is comprised of a multilayer coating for providing a visible optical effect.

15. A plurality of pigment taggent flakes as defined in claim 2, wherein the flakes are coated with a non-conforming coating which lessens the depth of the grooves and wherein the indicia is not obscured by the coating.

16. A plurality of pigment taggent flakes as defined in claim 15, wherein the non-conforming coating enhances the contrast between the indicia and a background so that the indicia becomes more visible.

17. A plurality of pigment taggent flakes as defined in claim 15 wherein the pigment taggent flakes are edible flakes.

18. A plurality of pigment taggent flakes, each flake comprising a first major surface having a frame about at least 2 sides thereof defined by walls extending upward or downward therefrom, and a region within the frame having a first flake surface, wherein the height of at least one of the frame walls is at least $F_h$, and wherein the region within the frame of the first major surface has indicia defined by one or more grooves formed therein having a depth of less than $I_d$, wherein $F_h > I_d$, wherein each flake has a thickness in a region absent the indicia and absent the frame that is less than $F_h$, wherein the frame forms an outer periphery of the flake and at least partially surrounds the indicia and is separate therefrom.

19. A plurality of pigment taggent flakes as defined in claim 18, coated with a light transmissive non-conforming coating reducing the depth of grooves within the flake.

20. A plurality of pigment taggent flakes as defined in claim 19 wherein the non-conforming coating effectively planarizes the flakes.

21. A plurality of pigment taggent flakes as defined in claim 19, wherein the non-conforming coating is a sol-gel coating.

22. A plurality of pigment taggent flakes as defined in claim 19 wherein the pigment taggent flakes are edible flakes.

23. The plurality of pigment taggent flakes of claim 18, wherein the thickness of each pigment taggent flake is substantially uniform throughout the pigment taggent flake.

24. A plurality of taggent flakes, wherein each taggent flake has a periphery and wherein each taggent flake comprises:
    a material layer having a first surface on a first side thereof and a second surface on a second side thereof opposite the first side, wherein the material layer has a uniform thickness throughout the flake,
    wherein each taggent flake has one or more grooves formed inside the periphery thereof to define an identifiable symbol, the one or more grooves having a maximum depth greater than the thickness of the taggent flake, and
    wherein each taggent flake has a frame provided along at least a portion of the periphery thereof, the frame having a frame depth which is at least 50% greater than the maximum depth of the one or more grooves.

25. The plurality of taggent flakes of claim 24, wherein the plurality of taggent flakes includes a first taggent flake and a second taggent flake, wherein the frame is not provided along the entire periphery of the first taggent flake, and wherein the frame is provided along the entire periphery of the second taggent flake.

\* \* \* \* \*